United States Patent
Sandor

(10) Patent No.: US 10,776,870 B2
(45) Date of Patent: Sep. 15, 2020

(54) COMPUTER NETWORK SYSTEMS FOR ACCURATE MARKET BASED BENCHMARK ESTIMATES

(71) Applicant: ENVIRONMENTAL FINANCIAL PRODUCTS, LLC, Chicago, IL (US)

(72) Inventor: Richard L. Sandor, Chicago, IL (US)

(73) Assignee: ENVIRONMENTAL FINANCIAL PRODUCTS, LLC, Chicago, IL (US)

( * ) Notice: Subject to any disclaimer, the term of this patent is extended or adjusted under 35 U.S.C. 154(b) by 343 days.

(21) Appl. No.: 15/690,171

(22) Filed: Aug. 29, 2017

(65) Prior Publication Data

US 2017/0365001 A1 Dec. 21, 2017

Related U.S. Application Data

(63) Continuation of application No. PCT/US2015/018739, filed on Mar. 4, 2015, which is
(Continued)

(51) Int. Cl.
*G06Q 30/00* (2012.01)
*G06Q 40/04* (2012.01)
(Continued)

(52) U.S. Cl.
CPC .......... *G06Q 40/04* (2013.01); *G06Q 40/025* (2013.01); *G06Q 40/06* (2013.01); *H04W 4/50* (2018.02); *H04W 4/60* (2018.02)

(58) Field of Classification Search
CPC ....... G06Q 40/04; G06Q 40/025; G06Q 40/06
(Continued)

(56) References Cited

U.S. PATENT DOCUMENTS

| 7,085,738 B2 | 8/2006 | Tarrant |
| 7,502,756 B2 | 3/2009 | Pillai |

(Continued)

FOREIGN PATENT DOCUMENTS

| WO | 2014/025859 A2 | 2/2014 |
| WO | 2014/110021 A2 | 7/2014 |

OTHER PUBLICATIONS

NPL Search History.*
(Continued)

*Primary Examiner* — John H. Holly
(74) *Attorney, Agent, or Firm* — Katten Muchin Rosenman LLP

(57) ABSTRACT

A method and system for more accurately determining and providing market terms for conducting business transactions, wherein a plurality of computers are located at qualified institutions and are connected in electronic association in a cloud communication network, one of which is a server network device that maintains and/or provides the components of the system to process actual transaction data provided by the qualified institutions in real time to calculate market terms that are quickly transmitted back to the institutions. The server network device is a cloud server network device with one or more processors from plural network devices for communication with one or more processors or computers located at the qualified institutions. The market term estimates are calculated using less bandwidth and less processing cycles on the cloud communications network than on a conventional network.

20 Claims, 11 Drawing Sheets

Related U.S. Application Data a continuation-in-part of application No. 13/570,930, filed on Aug. 9, 2012, now abandoned.

(51) Int. Cl.
    *G06Q 40/02*   (2012.01)
    *G06Q 40/06*   (2012.01)
    *H04W 4/60*    (2018.01)
    *H04W 4/50*    (2018.01)

(58) Field of Classification Search
    USPC .............................. 705/37, 1.1, 35, 36 R, 39
    See application file for complete search history.

(56) References Cited

U.S. PATENT DOCUMENTS

| | | |
|---|---|---|
| 7,536,333 B1 | 5/2009 | Omansky |
| 7,555,453 B2 | 6/2009 | Ho et al. |
| 7,574,393 B2 | 8/2009 | Ho et al. |
| 7,657,481 B2 | 2/2010 | Ho et al. |
| 7,676,422 B2 | 3/2010 | Ho et al. |
| 7,685,047 B2 | 3/2010 | Coates |
| 7,685,057 B2 | 3/2010 | Chiulli et al. |
| 7,689,491 B2 | 3/2010 | Coates |
| 7,689,492 B2 | 3/2010 | Coates |
| 7,698,196 B1 | 4/2010 | Rouvinez et al. |
| 7,707,092 B1 | 4/2010 | Freed |
| 7,729,972 B2 | 6/2010 | Murphy et al. |
| 7,739,178 B2 | 6/2010 | Umlauf |
| 7,752,111 B2 | 7/2010 | Ho et al. |
| 7,756,768 B2 | 7/2010 | Ho et al. |
| 7,809,632 B2 | 10/2010 | Chiulli et al. |
| 7,818,241 B2 | 10/2010 | Ho et al. |
| 7,925,569 B2 | 4/2011 | Sinclair et al. |
| 7,987,127 B1 | 7/2011 | Oaten et al. |
| 8,024,246 B2 | 9/2011 | Alderman et al. |
| 8,055,565 B2 | 11/2011 | Tarrant |
| 8,121,935 B2 | 2/2012 | Chiulli et al. |
| 8,150,756 B2 | 4/2012 | Alderman et al. |
| 8,165,942 B1 | 4/2012 | Rordorf |
| 8,219,479 B1 | 7/2012 | D'Amico |
| 8,255,302 B2 | 8/2012 | Chen |
| 8,306,892 B1 | 11/2012 | Gross et al. |
| 8,335,735 B1 | 12/2012 | Chafkin et al. |
| 8,346,654 B2 | 1/2013 | Weiss |
| 8,363,806 B2 | 1/2013 | Bookstall |
| 8,392,309 B2 | 3/2013 | O'Flinn et al. |
| 8,396,769 B1 | 3/2013 | Selig et al. |
| 8,401,956 B2 | 3/2013 | Mott |
| 8,429,043 B2 | 4/2013 | Glicksman et al. |
| 8,463,765 B2 | 6/2013 | Lesavich |
| 2002/0052820 A1 | 5/2002 | Gatto |
| 2003/0233306 A1 | 12/2003 | Madhavan et al. |
| 2006/0173763 A1 | 8/2006 | O'Connor et al. |
| 2007/0005469 A1 | 1/2007 | Ho et al. |
| 2007/0005470 A1 | 1/2007 | Ho et al. |
| 2007/0005471 A1 | 1/2007 | Ho et al. |
| 2007/0005473 A1 | 1/2007 | Ho et al. |
| 2007/0005474 A1 | 1/2007 | Ho et al. |
| 2007/0005475 A1 | 1/2007 | Ho et al. |
| 2007/0005476 A1 | 1/2007 | Ho et al. |
| 2007/0022033 A1 | 1/2007 | Ho et al. |
| 2008/0195553 A1 | 8/2008 | Umlauf |
| 2008/0195557 A1 | 8/2008 | Umlauf |
| 2008/0208769 A1 | 8/2008 | Beer et al. |
| 2009/0030829 A1 | 1/2009 | Chatter et al. |
| 2009/0099949 A1 | 4/2009 | Ho et al. |
| 2009/0099950 A1 | 4/2009 | Ho et al. |
| 2009/0106140 A1* | 4/2009 | De La Motte ......... G06Q 40/06 705/37 |
| 2009/0138409 A1 | 5/2009 | Galanis |
| 2009/0222385 A1 | 9/2009 | Chen |
| 2010/0198744 A1 | 8/2010 | Tuckman |
| 2010/0241593 A1 | 9/2010 | Umlau |
| 2010/0268632 A1 | 10/2010 | Rosenthal |
| 2010/0268663 A1* | 10/2010 | Asplund ................ G06Q 40/06 705/36 R |
| 2010/0268832 A1 | 10/2010 | Lucas et al. |
| 2010/0325067 A1 | 12/2010 | Cagan et al. |
| 2011/0004568 A1 | 1/2011 | Phillips et al. |
| 2011/0022539 A1 | 1/2011 | Joenk |
| 2011/0208710 A1 | 8/2011 | Lesavich |
| 2011/0258103 A1 | 10/2011 | Oaten et al. |
| 2011/0288960 A1 | 11/2011 | Rooney |
| 2012/0022988 A1 | 1/2012 | Shalen |
| 2012/0095904 A1 | 4/2012 | Katsuyama et al. |
| 2012/0116782 A1 | 5/2012 | Punnoose et al. |
| 2012/0130883 A1 | 5/2012 | Suresh et al. |
| 2012/0179630 A1 | 7/2012 | Ahn et al. |
| 2012/0278622 A1 | 11/2012 | Lesavich et al. |
| 2012/0290502 A1 | 11/2012 | Dickson et al. |
| 2012/0296793 A1 | 11/2012 | Wilson, Jr. et al. |
| 2012/0296798 A1 | 11/2012 | Riddle, Jr. et al. |
| 2012/0303511 A1 | 11/2012 | Sandor |
| 2013/0034217 A1 | 2/2013 | Bookstall et al. |
| 2013/0034224 A1 | 2/2013 | Bookstall et al. |
| 2013/0034225 A1 | 2/2013 | Bookstall et al. |
| 2013/0132304 A1 | 5/2013 | Sandor et al. |
| 2014/0149272 A1* | 5/2014 | Hirani ................... G06Q 90/00 705/37 |
| 2014/0189792 A1 | 7/2014 | Lesavich et al. |

OTHER PUBLICATIONS

International Search Report and Written Opinion, Appl. No. PCT/US2015/018739, dated Nov. 10, 2015.

International Search Report and Written Opinion, Appl. No. PCT/US2013/053908, dated Dec. 9, 2014.

U.S. Appl. No. 13/570,930, Non-Final Rejection, dated Nov. 23, 2012.

U.S. Appl. No. 13/570,930, Final Rejection, dated Oct. 16, 2015.

U.S. Appl. No. 13/570,930, Advisory Action, dated Feb. 8, 2016.

U.S. Appl. No. 13/570,930, Non-Final Rejection, dated Sep. 28, 2016.

U.S. Appl. No. 13/570,930, Final Rejection, dated Mar. 6, 2017.

U.S. Appl. No. 13/570,930, Advisory Action, dated May 26, 2017.

\* cited by examiner

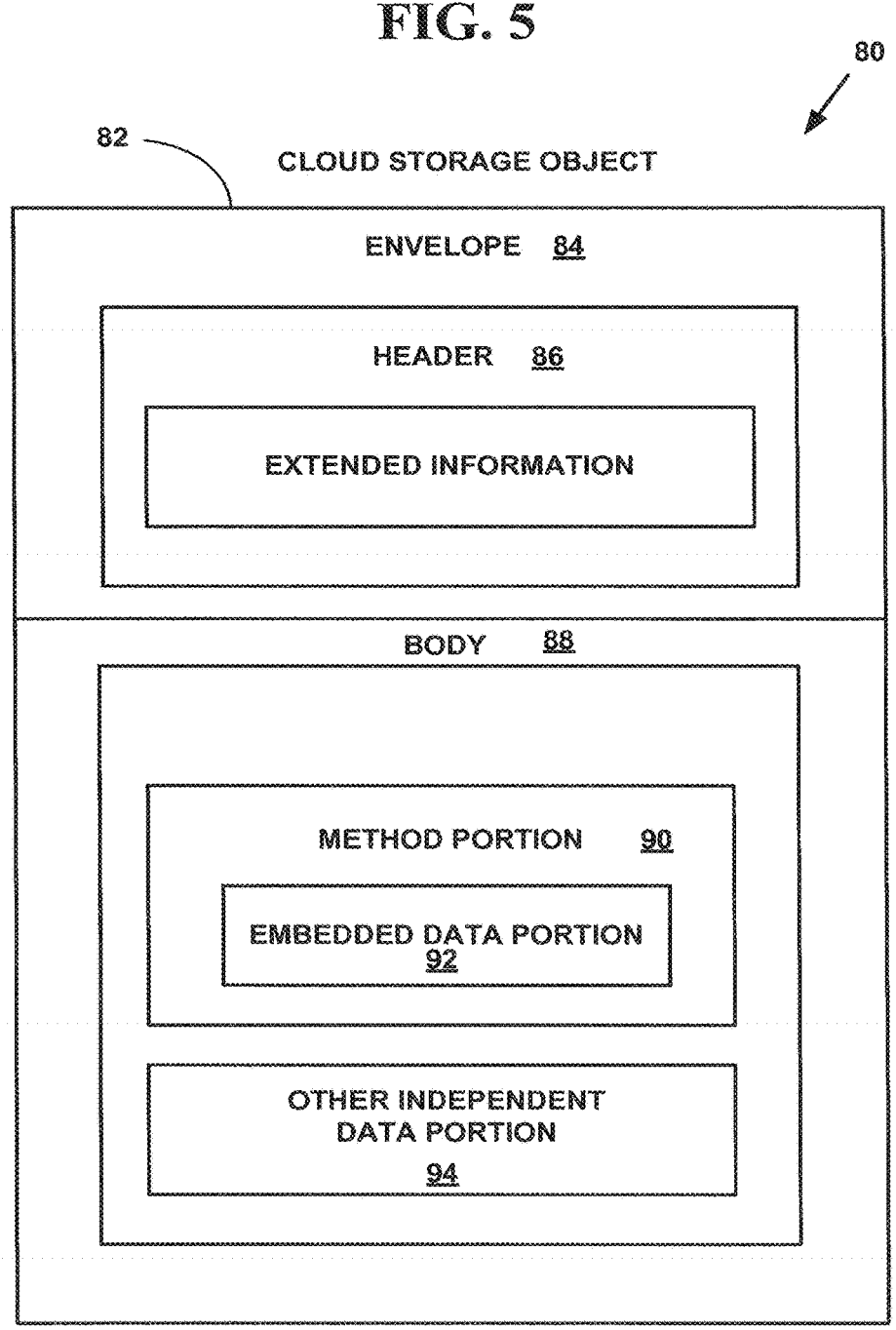

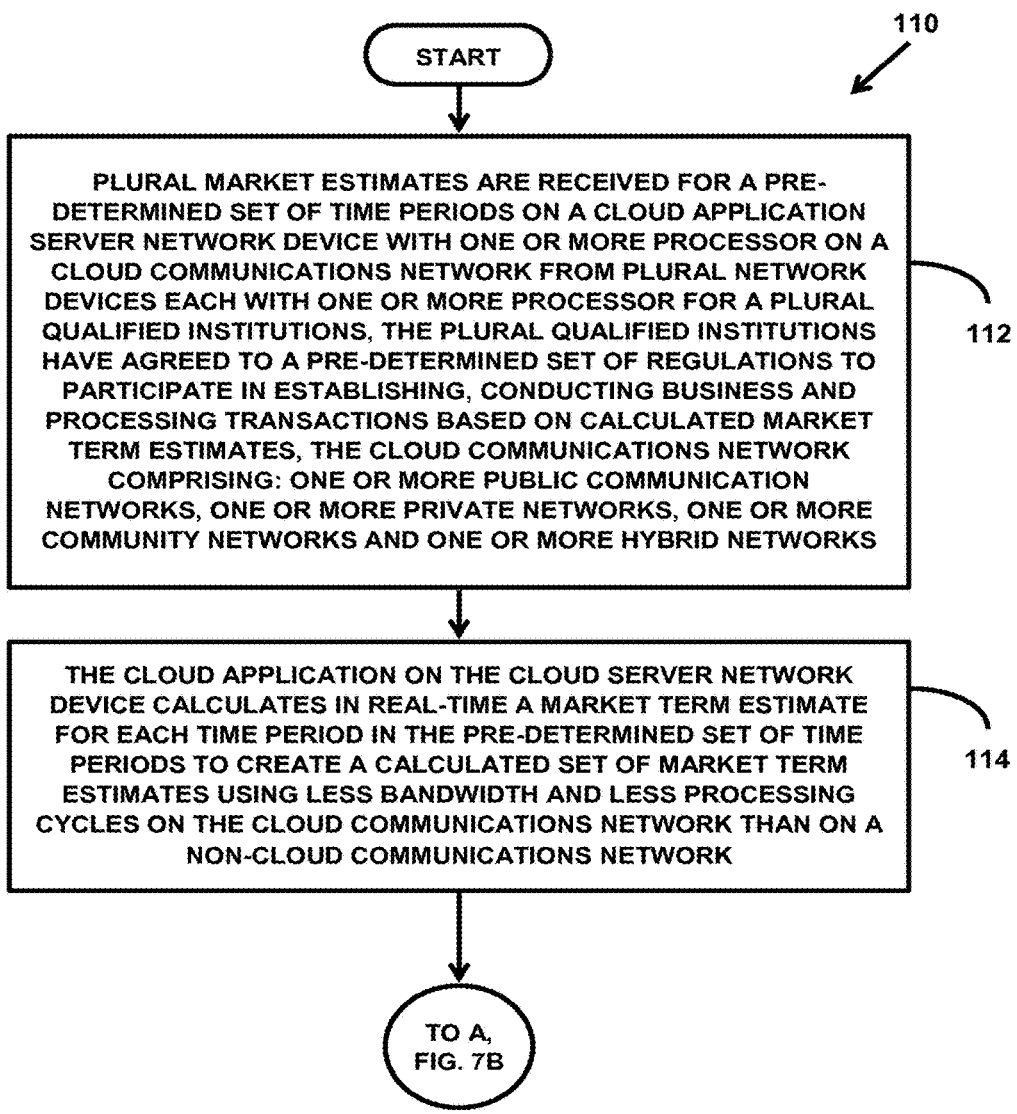

COMPUTER NETWORK SYSTEMS FOR ACCURATE MARKET BASED BENCHMARK ESTIMATES

CROSS-REFERENCE TO RELATED APPLICATIONS

This application is a continuation of International application no. PCT/US2015/018739 filed Mar. 4, 2015. This application is also a continuation-in-part of U.S. application Ser. No. 13/570,930 filed Aug. 9, 2012. The entire content of each of these applications is incorporated herein by reference thereto.

BACKGROUND

The present invention is directed to a system and method for more accurately determining and providing market terms for conducting business transactions which results in benchmarks. The present invention proposes a transparent transaction based and rules based system for arriving at interbank interest rates that may be applicable for large, intermediate and small sized banks. The present invention thus addresses a business challenge that is particular to the banking industry, in that it is able to apply computer processing in a new and useful way to fine tune and more accurately determine in real time an optimum and actual and verifiable benchmark such as an interest rate that banks can use in conducting loans or other transactions based on the analysis of actual transactions.

The London Interbank Offered Rate, or LIBOR, was created to provide an interest rate based on an average of daily estimates from participating banks. LIBOR is now used for derivatives contracts, as well as many credit cards, corporate loans and mortgages around the world. The average interest rate is estimated by leading banks in London that they would be charged for if borrowing from other banks. LIBOR, today, is the primary benchmark for short term interest rates around the world for banks of all sizes, but it has been criticized because it is based on estimates rather than on actual transactions.

The inter-bank lending market for midsized banks is set for transformational changes. These changes are triggered by shifts in regulatory environment, need for interest rate benchmarks and alternate interbank-funding opportunities for the banking industry. While these issues are true for the banking industry in general, the midsized banking sector, comprised of banks with assets ranging between $150 Billion to $1 Billion, will be particularly affected.

The Inter-bank funding market is fractured with multiple actors, interest rates and products. Interbank funds transactions are done through federal agencies, brokers and between banks involving different rates and tenures. At present, there does not exist a single organized market for interbank funding's causing higher transaction costs and market inefficiencies. In addition, the existing interbank market has not performed particularly well during times of financial crisis. During the financial crisis issues including uncertainty on counterparty credit worthiness, information asymmetry or potential lender's doubts on their own ability to borrow in the future causing severe constraints in interbank funding market. The daily average interbank lending volume has been declining since the 2008 financial crisis to about ~$114 billion at present from $145 billion in 1998. From a regulatory standpoint, there also exists uncertainty with regard to bank reporting requirements and funding levels that may impact adversely the interbank lending market. It is anticipated as the economy emerges from the unique interest rate regime and Federal Reserve measures in place currently, an organized market for interbank lending will be critical.

While the current global benchmark for interbank offers is LIBOR, many midsize American banks do not necessarily benchmark their assets through LIBOR alone. Other benchmarks include FHLB, Eurodollar, repurchase agreements and other such measures. These multiple rates are priced based on varying standards, sources and credit criteria. This suggests lack of true price discovery in the interbank market that is relevant for the Midsized banking sector.

Furthermore, a single global benchmark may not provide the best asset/liability management for midsized bank risk managers. This is especially true when interest rates normalize as the interbank offer rates that are relevant for larger banks will not be for the midsized banking sector. The inefficiencies with the current estimation of LIBOR, the global benchmark for interbank offer rate are well documented. LIBOR is an estimated rate and not a market determined rate. Further from a risk management standpoint, the uncertainty associated with the Libor estimates causes inefficiency and higher costs.

Accordingly, taking action to create a well-functioning and liquid market for interbank funds is needed as it makes good business sense for midsized banks because it should reduce the costs for doing business. Thus, it is desirable to solve some of the problems associated with calculating LIBOR rates, interest rates, commodity rates (e.g., gold or silver), foreign exchange rates and other market indexes or other market based rates based on market estimates.

SUMMARY OF THE INVENTION

The present invention now overcomes some of the problems associated with the problems associated with calculating LIBOR rates and other market rates with cloud computing networks. The present invention provides a transparent transaction based and rules based system for arriving at interbank interest rates that is applicable for large, intermediate and small sized banks. The invention is embodied in a system and method for determining market measures or benchmarks with market based estimates preferably conducted on cloud computing or other computer networks.

The invention more accurately determines and provides market terms for conducting business transactions. The system generally comprises a plurality of computers at qualified institutions in electronic association in a network. One of the computers is a server network device that maintains and/or provides:

an electronic participation database for listing qualified institutions that have previously agreed to be bound by a pre-determined set of regulations to participate in conducting business and processing transactions based on market term estimates that are calculated by the system;

a first network interface for privately communicating with the qualified institutions;

a processing engine for receiving data at a predetermined time from the listed institutions regarding market terms or benchmarks currently being proposed by such institutions; analyzing the received data and calculating one or more market term estimates within a set time after receipt of the data;

a communications module associated with the first network interface for promptly and simultaneously transmitting the calculated market term estimate(s) via a secure data feed to the computers of each of the qualified institutions that are listed in the electronic participation database;

an auction module associated with the first network interface for conducting an auction between the listed institutions to determine the institutions' response to the market term estimate(s) as suitable for implementation, wherein the institutions indicate acceptance of or modification of the provided market term estimate(s);

a verification module associated with the first network interface for adjusting the calculated market term estimate(s) based on the auction and for communicating the adjusted market term estimate(s) to the qualified institutions; and a second network interface for publicly communicating and displaying the adjusted market term estimate(s) after providing the same to the qualified institutions.

The processing engine preferably includes a data collection database for receiving the data from the listed institutions and a market term estimate calculation engine for calculating the one or more market term estimates. The server network device is preferably a cloud server network device with one or more processors from plural network devices for communication with one or more processors or computers located at the qualified institutions. The auction module preferably receives offer quantities from the qualified institutions that will increase by a factor between 1.25 and 4 for each tier of the offer curve derived from the offer amounts provided. Next, bid quantities are increased at the same factor for each tier of the bid curve derived from the bid quantities provided. Then, the cloud server device calculates in real-time a market term estimate to create a calculated set of market term estimates using less bandwidth and less processing cycles on the cloud communications network than on a non-cloud communications network. The market term estimate calculation module transmits the one or more market term estimates or benchmarks to the institutions within 1 to 2 minutes after receipt of the data. The system advantageously includes a records database for storing the adjusted market term estimates that are provided to the institutions and the public.

Another embodiment of the invention is a method for avoiding fraud and more fairly and accurately conducting business transactions at lower costs, with all steps conducted by a server network device that is in electronically association in a network with a plurality of computers at qualified institutions. The method comprises:

maintaining an electronic participation database comprising a listing of qualified institutions that have previously agreed to be bound by a pre-determined set of regulations to participate in conducting business and processing transactions based on market term estimates that are calculated by the server network device;

privately communicating with the qualified institutions over a first network interface in order to receive data at a predetermined time regarding market terms or benchmarks currently being proposed by such institutions;

analyzing the received data;

calculating one or more market term estimates within a set time after receipt of the data;

providing a private communications network comprised of the qualified institutions;

promptly and simultaneously transmitting the calculated market term estimates via a secure data feed over the first network interface to the computers of each of the qualified institutions that are listed in the electronic participation database;

conducting an auction over the first network interface between the institutions to determine the institutions' response to the market term estimate(s) as suitable for implementation, wherein the institutions indicate acceptance of or modification of the provided market term estimate(s);

adjusting the calculated market term estimate(s) based on the auction; and publicly communicating and displaying the calculated market term estimates over a second network interface after providing the same to the qualified institutions.

Yet another embodiment of the invention relates to the use of a server network device in a computer system comprising a plurality of computers at qualified institutions in electronic association in a network for more accurately determining and providing market terms for facilitating the conduct of business transactions by the qualified institutions. The server network device maintains and/or provides the components of the system as described herein.

Thus, the present invention facilitates and enables the qualified institutions to conduct business transactions based on the calculated market term estimate(s) or benchmarks in order to avoid fraud and to more fairly and accurately conduct such business at lower transaction costs than business conducted without use of the present system.

BRIEF DESCRIPTION OF THE DRAWINGS

Further features of this invention, its nature, and various advantages will become more apparent upon consideration of the following detailed description, taken in conjunction with the accompanying drawings, in which:

FIG. 5 is a block diagram illustrating an exemplary cloud storage object;

FIGS. 7A, 7B and 7C are flow diagrams illustrating a method for determining market estimates with market based measures on a cloud communications network.

DETAILED DESCRIPTION OF THE INVENTION

Figure 1:
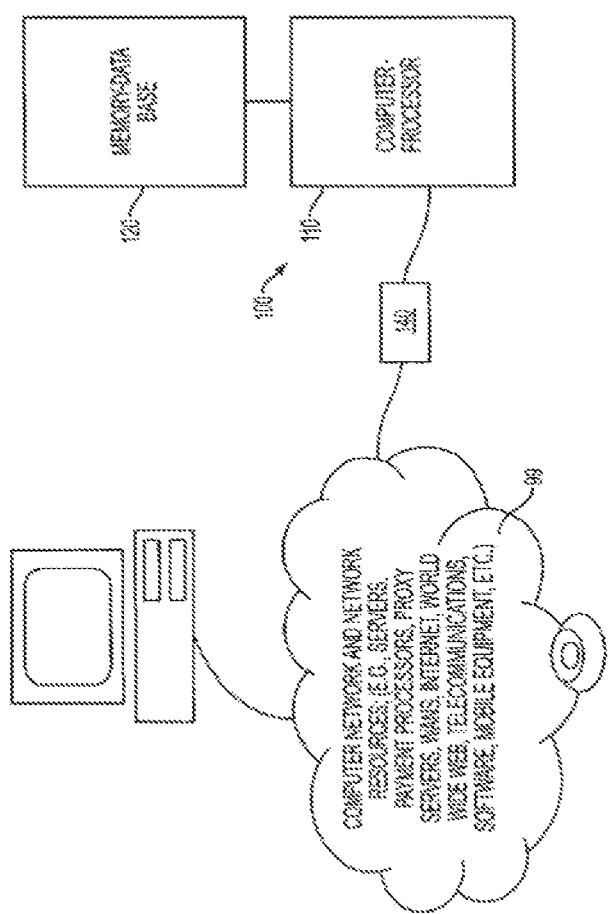
FIG. 1 is a high-level functional block diagram of a system and network for implementing the systems and methods of the present invention.

As explained herein, the present invention is directed to a system and method for more accurately determining and providing market terms for conducting business transactions which results in benchmarks such as interest rates, commodity rates (e.g., gold or silver), foreign exchange rates and other market indexes or other rates based on market estimates. As used herein the term "benchmark" is used to mean a standard or set of standards, used as a point of reference for evaluating performance, level of quality or a minimum term of acceptance for buying or selling general or specific items. Benchmarks may initially be drawn from a company's own experience, from the experience of many companies in the industry, or in some cases from legal or governmental requirements or mandates (e.g., environmental regulations). The present invention processes all this data to provide a more accurate benchmark or market estimate.

In particular, the present method utilizes:

Market based benchmarks for pricing various commodities and equity instruments;

An independent benchmarking process for interest rate that is transaction based; and Use of the benchmarking method for creating stratified sets of interest rates that serve the needs according to the size of the participating banks.

The present invention also provides solutions to the challenges to midsized banks by providing an organized, transparent and regulated platform for inter-bank lending and borrowing. Further, it utilizes a market-based approach to arrive at an interbank lending rate—called AMERIBOR—which is specifically targeted at the midsized banking sector. In doing so, the present invention prices interbank funding by establishing a benchmark based on actual market transactions.

The establishment of a regulated market for interbank funding along with the establishing of a transparent, market based benchmark for inter-bank borrowing and lending provides significant improvements over the current systems. By bringing many buyers and sellers together in a centralized regulated and transparent marketplace, the costs of doing business for market participants is significantly lowered. A further benefit is that the mid-sized banks are able to establish their own inter-bank rate separately from LIBOR, based on actual transactions, rather than rely on an "estimated" rate that is subject to speculation.

In a preferred embodiment relating to interest rates, the computer systems of the present invention are able to control the spread between the highest bids and offers of interest rates to within a finite and narrow basis point range at current levels. To do this, the server receives information from between 10 to 20 or even more participating banks of what their actual interest rates are and this data is then used to construct an offer curve in tiers that increases by a finite, small amount of basis points (e.g., by two basis points), while also constructing a bid curve in tiers that decrease by the same finite amount of points. A total of at least three offer tiers and three bid tiers are constructed from the collected data. The offer quantities and bid quantities are entered prior to any trades. The participating banks will also offer quantities that will double for each step of offer curve from the offer amount. The method is flexible however in that member banks have the option to input the tier values that satisfy the rules of the Exchange, and they can put in bids or offers that are tighter than the finite basis point value that is initially selected and they also can input quantities that are greater than the minimum required in each tier.

In particular, the participant banks are simply required to submit a bid and offer curve for 30-day interbank loans while also providing pre-determined credit approval and limits for all counterparties in the group. The submitted schedule includes an offer rate and offer quantity for a 30-day interbank loan or other tenors and a bid quantity to accept a 30-day interbank loan. The data submitted from the participating banks is submitted at a predetermined time and is processed relatively quickly to construct an offer and bid curve based on a set of established and transparent rules.

The particular rules require that the banks submit rates wherein:

the spread between the bid rate and offer rate must be within two basis points of current interest rate levels; and the banks must offer or borrow amounts according to those established in the minimum offer/bid quantity tiers. The following Table 1 is an example of the latter requirement:

TABLE 1

| Minimum Offer/Borrow Tiers are based on Bank Assets | |
|---|---|
| Assets | Tier |
| 500 Million to 10 Billion | 1 Million |
| 11 to 25 Billion | 2 Million |
| 26 to 75 Billion | 5 Million |
| 76 to 125 Billion | 10 Million |

As noted, the offer curve is constructed in tiers that increase by a narrow range of e.g., two basis points, while the bid curve is constructed in tiers that decrease by the same two basis points. A total of at least three offer tiers and three bid tiers are constructed from the collected data. The participating banks will also offer quantities that will increase based on predefined rules (e.g., doubling, tripling or other factors ranging from 1.25 to 4) for each tier of the offer curve, and offer quantities that increase for each tier in a similar way based on the bid curves.

Next, to calculate the mean or average rate, an auction is electronically conducted. The auction includes two periods: (1) a trade match and initial pricing period and (2) a price confirmation period. In the trade match period: potential matches are made between the submitted bid and offer rates, and this generally leads to actual transactions taking place. The matching process is conducted for fifteen minutes. During that period, the participating banks agree to not amend or cancel any existing submissions. Based on the matching that is analyzed, an initial interest rate is calculated and published to the participating banks. The rate may be calculated as a mean rate or a volume weighted rate of the matching transactions.

Once the initial rate has been established, an auction platform is opened for participating banks to submit new bids and offers to the existing positions although the existing bids or offers cannot be amended. Trades are conducted for another fifteen minutes. Based on the total transactions in both periods, a volume weighted rate is computed as the final rate.

Thereafter, an open trading session is conducted which is open to all participating banks where they may borrow or lend 30-day interbank loans at the final rate for thirty minutes. At the end of the open trading session, the total volume transacted and established final rate is compiled and transmitted to each of the participating banks.

Accordingly the present invention defines a technical solution to a technical problem through the implementation of computer software in the context of accurately determining interest rates for various commercial transactions. As can be appreciated, the more accurate the interest rate can be calculated and applied for use, the greater the cost savings to the buyers and in turn the general public.

The system utilizes a number of electronic components to carry out the interest rate determination in a highly accurate way. The components are part of a server network device and include:

an electronic participation database for listing qualified institutions that have previously agreed to be bound by a pre-determined set of regulations to participate in conducting business and processing transactions based on market term estimates that are calculated by the system;

a first network interface for privately communicating with the qualified institutions;

a processing engine for receiving data at a predetermined time from the listed institutions regarding market terms currently being proposed by such institutions; analyzing the received data and for calculating one or more market term estimates within a set time after receipt of the data;

a communications module associated with the first network interface for promptly and simultaneously transmitting the calculated market term estimate(s) via a secure data feed to the computers of each of the qualified institutions that are listed in the electronic participation database;

an auction module associated with the first network interface for conducting an auction between the institutions to determine the institutions' response to the market term estimate(s) as suitable for implementation, wherein the institutions indicate acceptance of or modification of the provided market term estimate(s);

a verification module associated with the first network interface for adjusting the calculated market term estimate(s) based on the auction and for communicating the adjusted market term estimate(s) to the qualified institutions; and a second network interface for publicly communicating and displaying the adjusted market term estimate(s) after providing the same to the qualified institutions.

In a preferred embodiment, the processing engine includes a data collection database for receiving the data from the listed institutions and a market term estimate calculation engine for calculating the one or more market term estimates. Also, the system preferably includes a records database for storing the adjusted market term estimates that are provided to the institutions and the public.

As noted herein, the communication network of the invention should be a cloud communications network with the server network device being a cloud server network device with one or more processors from plural network devices for communication with one or more processors or computers located at the qualified institutions. This allows the cloud server device to calculate in real-time a market term estimate for certain time periods to create a calculated set of market term estimates using less bandwidth and less processing cycles on the cloud communications network than on a non-cloud communications network. By "real time," what is meant that the market term estimate calculation module calculates and transmits the one or more market term estimates to the institutions within 1 to 2 minutes after receipt of the data by the data collection module.

In a preferred embodiment, the invention provides a computerized, multi-step electronic loan transaction loan transaction trading system. This system includes:

an application server, wherein during a first electronic trading step, said application server receives first trading party data from a first trading party computerized system, said first trading party data including:

first trading party identity data; and first trading party interest rate data for an electronic loan transaction.

The application server receives second trading party data from a second trading party computerized system, said second trading party data including:

second trading party identity data; and second trading party interest rate data for said electronic loan transaction.

The application server also includes a predetermined, stored computerized listing of a plurality of trading party identity data in addition to said first trading party identity data and said second trading party identity data, wherein said computerized listing represents the only trading party computerized systems from which trading party data will be accepted during said first electronic trading step and from which trading party data is required to be received during said first electronic trading step. Thus, when said application server automatically electronically determines that:

a) said first trading party identity data matches a trading party identity data included in said predetermined, stored computerized listing, b) said second trading party identity data matches a trading party identity data included in said predetermined, stored computerized listing, and c) interest rate data for said electronic loan transaction has been received from all trading party computerized systems representing a trading party identity data included in said predetermined, stored computerized listing, the application server determines an average market rate data for said electronic loan transaction representing an average market rate determined by averaging said interest rate data received from all trading party computerized systems having a trading party identity data included in said predetermined, stored computerized listing.

The submission of said first trading party data by said first trading party computerized system represents an irrevocable command to execute a trade in said electronic loan transaction at said average market rate once it is determined, even when said average market rate differs from said first trading party interest rate data for said electronic loan transaction. Also, the submission of said second trading party data by said second trading party computerized system represents an irrevocable command to execute a trade in said electronic loan transaction at said average market rate once it is determined, even when said average market rate differs from said second trading party interest rate data for said electronic loan transaction The system includes an electronic trading platform, wherein said electronic trading platform receives from said application server:

said first trading party identity data;

said second trading party identity data; and said average market rate data for said electronic loan transaction, The electronic trading platform automatically executes an electronic trade in said electronic loan transaction at said average market rate between said first trading party computerized system and said second trading party computerized system.

During a second electronic trading step, the electronic trading platform transmits data representing said electronic trade and said average market rate data to a plurality of wider market computerized systems, wherein said wider market computerized systems include computerized systems in addition to said trading party computerized systems representing a trading party identity data included in said predetermined, stored computerized listing. Thus, the electronic trading platform accepts from said wider market computerized systems trade data representing revocable trading commands to execute trades in said electronic loan transaction.

This application server advantageously includes a predetermined, stored computerized listing of a set of electronic loan transactions representing a plurality of maturities, wherein said first trading party data includes first trading party interest rate data for a plurality of electronic loan transactions and said second trading party data includes second trading party interest rate data for said plurality of electronic loan transactions.

The application server automatically electronically determines that interest rate data for said plurality of electronic loan transactions has been received from all trading party computerized systems representing a trading party identity data included in said predetermined, stored computerized listing. This is achieved by the application server determining an average market rate data for each of said plurality of electronic loan transactions representing an average market rate for each of said plurality of electronic loan transactions determined by averaging said interest rate data for each of said plurality of electronic loan transactions received from all trading party computerized systems having a trading party identity data included in said predetermined, stored computerized listing. Also, the submission of said first trading party data by said first trading party computerized system represents an irrevocable command to execute a trade in at least one of said plurality of said electronic loan transactions at said average market rate once it is determined, even when said average market rate differs from said first trading party interest rate data for said electronic loan transaction.

Another preferred embodiment of the invention relates to a computerized, multi-step electronic loan transaction trading system. This system is similar to the prior embodiment but the application server receives:

first trading party identity data;

first trading party electronic loan transaction trade amount data;

first trading party interest rate data for an electronic loan transaction, second trading party identity data;

second trading party electronic loan transaction trade amount data; and second trading party interest rate data for said electronic loan transaction, The application server automatically electronically determines that electronic loan transaction trade amount data has been received from all trading party computerized systems representing a trading party identity data included in said predetermined, stored computerized listing, and determines an average market rate data for said electronic loan transaction representing an average market rate determined by calculating a weighted average based on said electronic loan transaction trade amount data and said interest rate data received from all trading party computerized systems having a trading party identity data included in said predetermined, stored computerized listing. The submission of such data represents an irrevocable command to execute a trade in said electronic loan transaction at said average market rate once it is determined, even when said average market rate differs from said second trading party interest rate data for said electronic loan transaction. The electronic trading platform automatically executes an electronic trade initially in said electronic loan transaction at said average market rate between said first trading party computerized system and said second trading party computerized system, and then during a second electronic trading step, transmits data representing said electronic trade and said average market rate data to a plurality of wider market computerized systems, wherein said wider market computerized systems include computerized systems in addition to said trading party computerized systems representing a trading party identity data included in said predetermined, stored computerized listing This allows the electronic trading platform to accept from said wider market computerized systems trade data representing revocable trading commands to execute trades in said electronic loan transaction.

In this system, the application server includes a predetermined, stored computerized listing of a set of electronic loan transactions representing a plurality of maturities and the first trading party data includes first trading party interest rate data for a plurality of electronic loan transactions and said second trading party data includes second trading party interest rate data for said plurality of electronic loan transactions.

The application server automatically electronically determines that interest rate data for said plurality of electronic loan transactions has been received from all trading party computerized systems representing a trading party identity data included in said predetermined, stored computerized listing. Additionally, the application server determines an average market rate data for each of said plurality of electronic loan transactions representing an average market rate for each of said plurality of electronic loan transactions determined calculating a weighted average based on said electronic loan transaction trade amount data and said interest rate data for each of said plurality of electronic loan transactions received from all trading party computerized systems having a trading party identity data included in said predetermined, stored computerized listing. As noted, the submission of said first trading party data by said first trading party computerized system represents an irrevocable command to execute a trade in at least one of said plurality of said electronic loan transactions at said average market rate once it is determined, even when said average market rate differs from said first trading party interest rate data for said electronic loan transaction.

Another embodiment of the invention relates to a method for electronic market estimation with market based measures on a cloud communications network wherein all steps are conducted by one or more computer processors. This method includes a number of steps, including:

receiving a plurality of electronic agreements from a plurality of network devices each with one or more processors for a plurality of qualified institutions on a cloud application on a cloud server network device with one or more processors on a cloud communications network, the plurality of electronic agreements including a pre-determined set of regulations for the plurality of qualified institutions to participate in establishing, conducting business and processing transactions based on market term estimates calculated on the application on the server network device the cloud communications network comprising: one or more public communication networks, one or more private networks, one or more community networks and one or more hybrid networks;

receiving a plurality of market estimates for a pre-determined set of time periods on a the cloud application on a the cloud server network device with one or more processors on a the cloud communications network from a the plurality of network devices each with one or more processors for a plurality of qualified institutions;

calculating in real-time on the cloud application on the cloud server network device a market term estimate for each time period in the pre-determined set of time periods to create a calculated set of market term estimates using less bandwidth and less processing cycles on the cloud communications network than on a non-cloud communications network, wherein the calculated set of market term estimates are compiled and made available in real-time at a time-1 only to the plurality of qualified institutions until one or more actual transactions have been completed between the one or more qualified institutions using one or more market term estimates from the calculated set of market term estimates;

storing securely with the cloud application on the cloud server network device the calculated set of market term estimates in a cloud storage object on the cloud communications network, wherein the cloud storage object is located anywhere on the one or more public communication networks, one or more private networks, one or more community networks and one or more hybrid networks of the cloud communications network;

sending securely in real-time at time-1 from the cloud application on the cloud server network device via the cloud communications network the calculated set of market term estimates in the cloud storage object to the plurality of network devices for the plurality of qualified institutions via the cloud communications network, wherein the cloud storage object is sent securely from one or more public communication networks, one or more private networks, one or more community networks and one or more hybrid networks anywhere on the cloud communications network;

presenting and displaying the securely sent set of compiled calculated market term estimates on computer displays of the qualified institutions for viewing and determining how to conduct business or transactions, wherein the displayed estimates improve the functioning and performance of the server network devices by providing the estimates resident for immediate use by the qualified institutions, wherein the plurality of qualified institutions have agreed to be obligated to conduct all business and make all transactions based on the calculated set of market term estimates calculated on, sent from the application on the server network device, and viewed on the computer displays, wherein the qualified institutions conduct business by requiring some institutions to offer amounts of funds at higher rates above the market term estimates, requiring other institutions to borrow amounts of funds at lower rates below the market term estimates, and requiring all institutions to transact a certain amount of funds with other institutions, with all transactions conducted and cleared electronically;

receiving one or more messages on the cloud application on the cloud server network device via the cloud communications network from two or more of the network devices for two or more selected ones of qualified institutions from the plurality of qualified institutions receiving confirmations of one or more actual transactions that have been completed between the two or more selected ones qualified institutions using one or more market term estimates from the calculated set of market term estimates to ensure that the institutions are complying with the established market term estimates;

sending securely in real-time at a later time-2 the calculated set of market term estimates in the cloud storage object from the cloud application on the cloud server network device via the cloud communications network to a plurality of other server network devices and to a plurality of other target network devices each with one or more processors to provide electronic information as an indication of how the qualified institutions are required to further conduct business based on the calculated set of market term estimates, wherein the cloud storage object is sent securely from one or more public communication networks, one or more private networks, one or more community networks and one or more hybrid networks anywhere on the cloud communications network: and displaying in real-time at a later time-3 from the cloud application on the cloud server network device via the cloud communications network on a plurality of graphical user interfaces on the plurality of other server network devices and the plurality of target network devices, the calculated set of market term estimates in the cloud storage object to provide further requirements of how the qualified institutions are required to conduct business and process transactions based on the calculated set of market term estimates for each time period in the pre-determined set of time periods.

The method may also include:

calculating a set of non-market term estimates for each time period in another pre-determined set of time periods to create a calculated set of non-market term estimates, wherein the non-market estimates include estimate values of goods and services that are not bought and sold or traded in defined financial or trading markets; and requiring the plurality of qualified institutions to conduct all business and make all transactions based on the calculated set of non-market term estimates calculated on the application on the server network device.

Typically, the qualified institution include financial institutions, industrial institutions, utility institutions, trading institutions, data providing institutions, environmental institutions and other institutions that provide goods or services, and wherein the calculated set of market terms includes market terms and indexes for stocks, bonds, commodities, hedge funds, goods or services sold, traded or exchanged via a defined market.

Preferably, in this method, wherein the calculating step includes:

arranging the plurality of received market estimates in ascending order; eliminating a top 20% and a bottom 20% of the plurality of received market estimates; and calculating a term estimate for each time period in the pre-determined set of time periods as a simple arithmetic average of remaining entries per time period or by a volume weighted average of the plurality of received market estimates and an accompanying size of the of the plurality of received market estimates.

Alternatively, and preferably, the calculating step includes:

receiving from participating qualified financial institutions bids and offers based on an overnight interest rate;

conducting trades between participants based on matching bids and offers that are received in order to calculate an initial a market term estimate;

allowing further trading to occur based on the initial market term estimate; and establishing a final market term estimate as weighted average of all trades.

The cloud storage object may include one or more of a REpresentational State Transfer (REST) or Simple Object Access Protocol (SOAP), Lightweight Directory Access Protocol (LDAP) cloud storage objects, portions thereof, or combinations thereof and the sending securely steps include securely sending using a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), Transport Layer Security (TLS) security method.

The cloud server network device and the target network device preferably include a wireless networking interface comprising a Worldwide Interoperability for Microwave Access (WiMax) wireless networking interface with 4th generation (4G) wireless speeds for communicating with the cloud communications network, wherein the cloud communications network includes an electronic market term estimate calculation service, a cloud computing platform for the electronic market term estimate calculation service and a cloud computing infrastructure for the market term estimate calculation service and wherein the cloud application offers a cloud computing Infrastructure as a Service (IaaS), a cloud Platform as a Service (PaaS) and offers a Specific cloud software service as a Service (SaaS) including a specific cloud software service for electronic market term estimate calculations.

Also, the calculated set of market terms may include a London Interbank Offered Rate (LIBOR) interest rate, a Singapore Interbank Offered Rate (SIBOR) interest rate or a Hong Kong Interbank Offered Rate (HIBOR) interest rate and other equivalents, market terms and indexes for stocks, bonds, commodities, hedge funds, goods or services sold, traded or exchanged via a defined market, and the method further comprises displaying from on a graphical user interface from another cloud application on the plurality of target network devices the calculated set of market term estimates to provide information as an indication of how the qualified institutions are required to conduct business and process transactions based on the calculated set of market term estimates.

Referring now to the Figures, the system of the invention is operated by an independent party who preferably is not one of the qualified institutions. The independent party is in charge of the network server device which is an integral component of the computer system. The inventive computer system 100 comprises one or more computers, servers, laptops, tablets, smartphones, peripherals, etc. Computer system 100 receives the market information through network 99 at its communication hardware 140. Communication hardware 140 may be internal components of a computer or separate distributed hardware that connects the computer system to a network. Communication hardware 140 receives the transaction information, which includes amounts and interest rates from each of the qualified institutions at a predetermined time, such as by 10:30 AM. Communication hardware 140 is also configured to transmit the calculated market rates back to the qualified institutions for use.

FIG. 1 illustrates computer system 100, which may comprise computer processor 110 having one or more central processing units, and non-transient memory 120 for storing data and software. Computer system 100 is configured to carry out the steps encoded in software instructions for manipulating the data received from the institutions over the lines of communication, for calculating the market estimate (s) from such data and for storing the initially received and calculated data in memory 120. The computer system may further comprise transient memory, for example, RAM, for processing the data and instructions, and peripherals such as displays, printers, keyboards, mice, and interface devices known to those in the computer arts. Memory 120 can be an internal or external database. If desired, one or more computers and storage systems can be used to assist the server device in implementing the overall processing and operation of the computer system 100.

Figure 2:
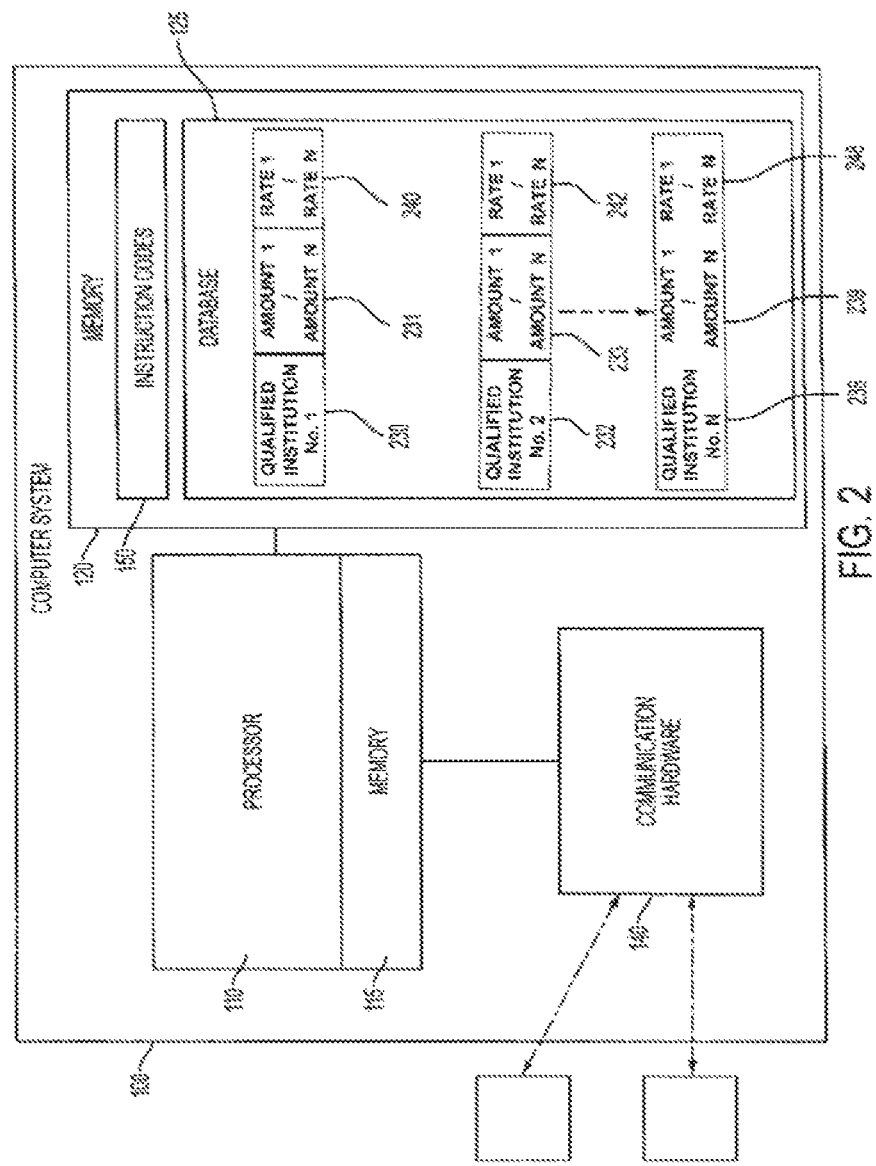
FIG. 2 is a functional block diagram illustrating a computer system configured to be in communication with other remote systems.

An embodiment of computer system 100 is illustrated in FIG. 2. With reference now to FIG. 2, computer system 100 can include processor 110 associated with memory 115, and memory 120. Memory 120 can be configured to include software comprising instruction codes 150 (e.g., a resident executable software application), and a structured database 125 for storing data in records. In implementation, memory 120 may be implemented using multiple computers containing structured databases in order to provide sufficient database resources to the system. Memory 115 would typically be RAM or other form of cached resources that can hold executable code and related data in computer operation. Memory 120 will typically be structured to contain non-transient computer readable medium for use in operation of the system. Database 125 can include information provided by each qualified institutions as to market data, i.e., amounts and interest rates and contain a database that stores such data and data structures. For example, as shown, data fields 230-239, 240, 242, 244, 248 are included in database 125 for each business day that the information is provided to the independent party.

A general purpose system may encounter problems with managing large amounts of data in a plurality of qualified institution accounts and daily data records spread over dispersed components. To handle the number of qualified institution accounts and daily data records and to assure that the accounts properly include daily entries without duplications or separation of data over disconnected storage sites, the system is advantageously configured to use a unique identification code for each qualified institution account. Furthermore, to avoid the possibility of inadvertently created duplicate records, the system could also be configured to search the system storage for the identification code to confirm that the record(s) used to maintain the data values of a particular account exists in the system and are the proper record(s) for the specific account. The system also could be configured to utilize the identification code for the transmission of the calculated market values back to the qualified institution to assure each receives the necessary information at the same time as the other institutions. The system may be configured to require the institution to also utilize the identification code when transmitting or receiving the account information or calculated market values for security purposes.

The information relating to the account can be entered into computer system 100 through an interface and stored in database 125. Database 125 may be, for example, a relational, hierarchical, object-oriented, network, or correlation database. Transmitted information of amounts and interest rates may be quickly relayed to each institution's account where the information may be stored in records. The database may be localized on a single machine or distributed over multiple machines at the same or different locations.

Communication hardware 140 allows the computer system 100 to transmit and receive data over communication lines connected to one or more networks, which may be for example, the Internet, LAN, WAN, and MAN networks, telecommunication networks, satellite networks, and/or wireless networks. Communication hardware 140 may handle the packetizing or depacketizing of data and handle protocol requirement necessary for transmitting and receiving packets. Communication hardware 140 can transmit or receive data or information to or from computer system 100, which it is serving.

Problems may be encountered by general computing systems with delays in communication of transaction and account data between various disperse system components.

To handle the volume of data communicated from multiple physical localities at essentially the same time, the system should have a sufficient capacity of parallel communication channels that can both receive the expected volume of data from transactions, identify the correct hardware installations and/or components where the corresponding data records are stored, and transfer the data to the correct computer system component(s) for calculation and record updating, all in a timely manner. Transmissions to the system 100 through the communication hardware 140 may comprise addresses identifying the correct hardware installations and/or components where the corresponding data records are stored.

Institution accounts 230, 232, and 238 can be stored in memory 120 for association with daily provided data relating to amounts and interest rates for various actual transactions, and this data can be temporarily stored in a physically or logically separate memory before being added to the institution accounts.

In operation, after receipt of additional daily information, database 125 is updated to reflect the additional information provided. Database may also be update with the provision of the calculate market estimates that are transmitted back to the institution so that a complete historical record is available in each account. These records may also be viewed by the qualified institution logging onto a website of the independent party with access by its identification code and an institution selected password.

Figure 3:
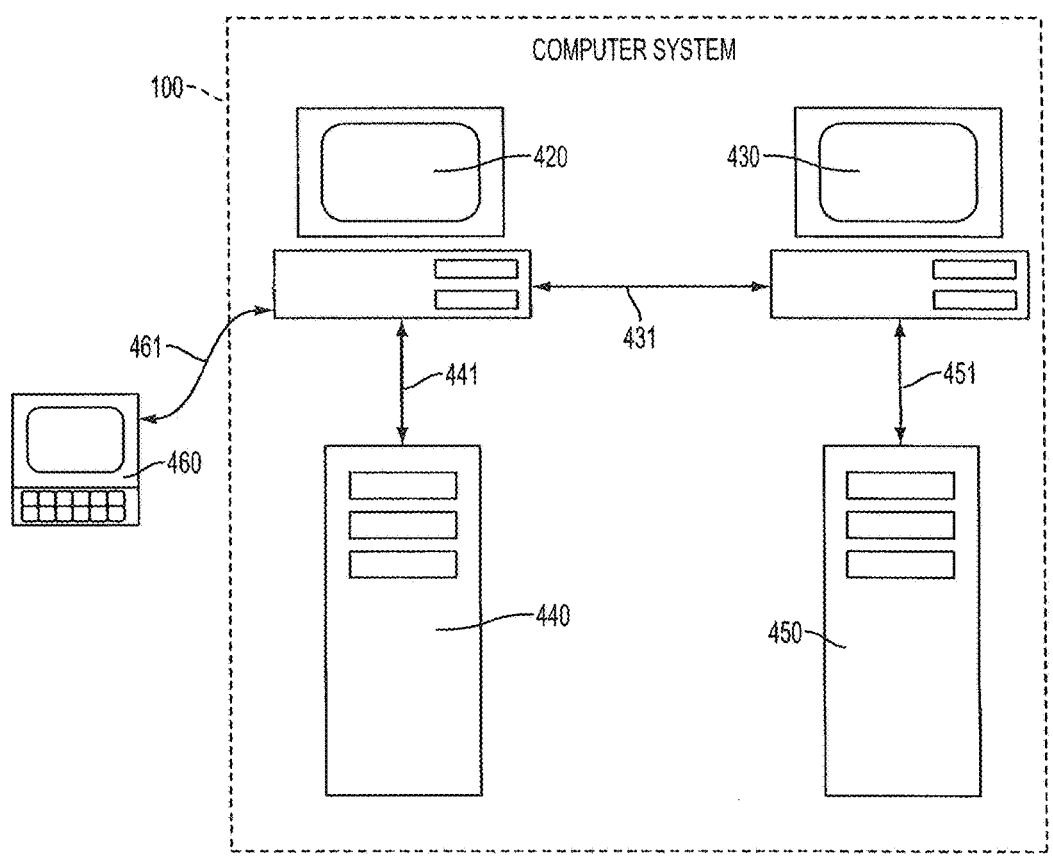
FIG. 3 is a diagram of a functional block diagram illustrating an embodiment in which administration of the account and updating of transmitted market estimates to the account can be operated on different computer systems.

In some embodiments, a system and method can be implemented that divide the storage and administration of account information between two entities or systems. For example, a first entity or system can be responsible for creating and administering the institution account while another entity can be responsible for storing the transmitted market values and updating of the account to include that information. An illustrative embodiment of this arrangement is shown in FIG. 3, wherein computer system 100 can include multiple computer systems 420, 430 that communicate with each other and with one or more other devices 440, 450 that are remote from the computer system 100 over data communications lines. The data communications can be used for sending and receiving data related to information received from the institutions and data for updating the accounts with the calculated market estimates for the various amounts and applicable interest rates for the borrowers or lenders.

Problems with maintaining and managing multiple diverse records at the same time may arise, such that an embodiment of the system could be configured to identify all of the accounts, storage records, and transactions as belonging to the same account regardless of where the information is being communicated or stored. This may be accomplished by an application and one or more identification table(s) that assigns the unique identification code when an account is created and stores the identification code with at least a portion of the record storage addresses in other components of the system 420, 430 associated with the account. Data communications could also include the address of the component of the system 420, 430 intended to receive the data. Backup records stored on separate systems could also be identified by their addresses and stored in the table.

In another embodiment, use of a single look-up table in a central, accessible, location containing storage addresses could allow coordination of data storage across all components 420, 430, 440, 450 of a system by identifying the correct information with the correct account, flagging a record as being updated by a transaction, and locking access to other associate records by other system components until updating of a record is complete.

Computer system 100 may comprise separate computer(s) 420 for opening and administering the institution accounts with the data provided thereby, and separate computer(s) 430 for updating the institution accounts with the calculated market estimates. Computer(s) 420 and computer(s) 430 can communicate over a data line 431 (e.g., wired, wireless, WAN, LAN, Internet, etc.). These computers may also be in communication with one or more database servers 440, 450 over data communication lines 441, 451 for storage and retrieval of historical or backup data for the institution accounts.

Computer system 100 may further comprise communication hardware 140 that could be integral with one of the computers e.g., 420, or hardware separate from any particular computer, that connects computer system 100 over one or more communication line(s) 461 to remote devices 460. Remote devices 460 can include a user interface for the institutions. Computer system 100 is configured to send information to the remote device 460 to display market estimates to the institutions and to receive information regarding the transmittal of institutional data so that the market estimates may be calculated by the server device.

Figure 4:
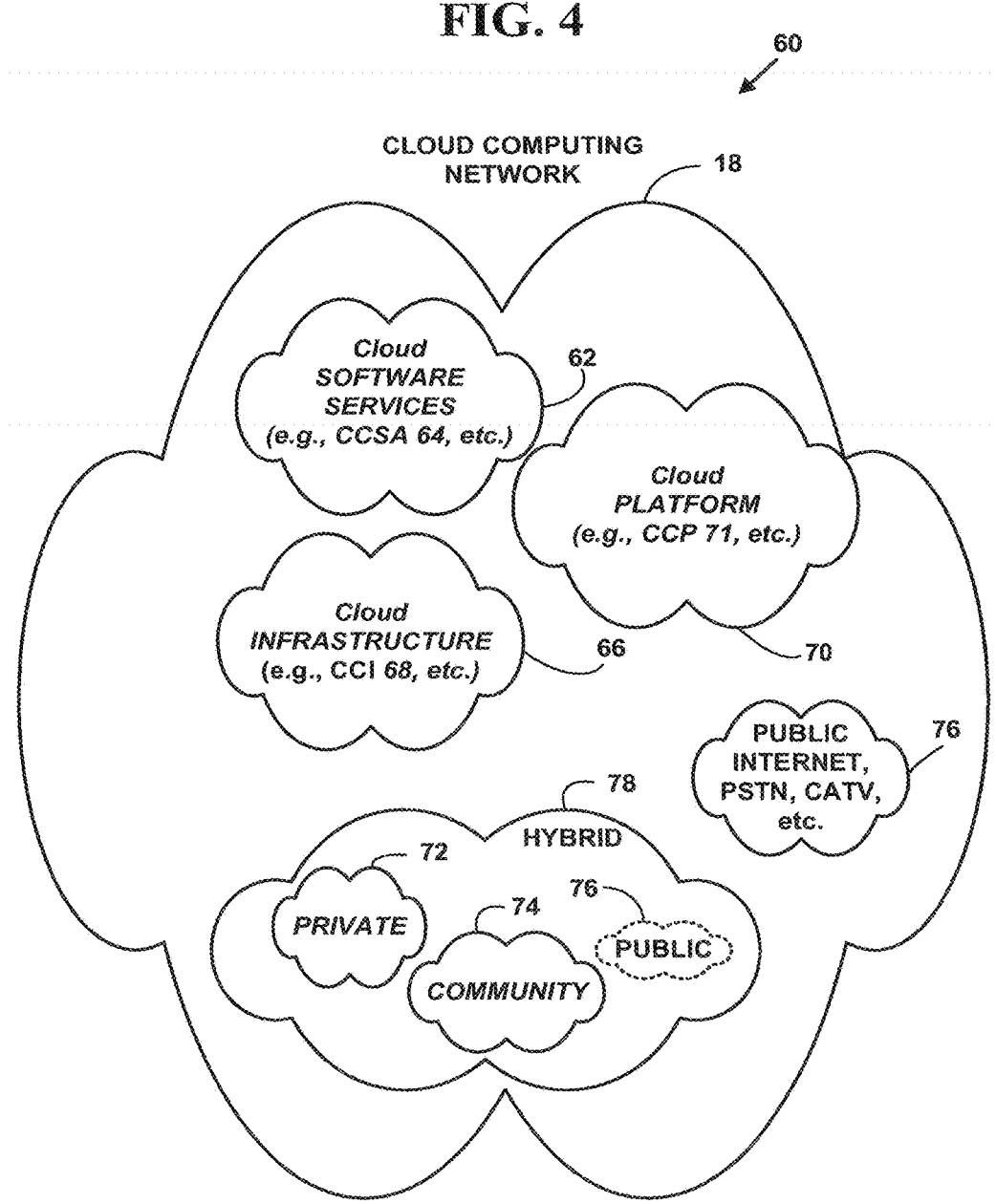
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics include the following:

On-demand electronic market estimate calculation computing services.

Electronic market estimators can unilaterally provision computing capabilities, such as server time and network storage, as needed automatically without requiring human interaction with each network server on the cloud communications network 18.

Broadband network access. Electronic market estimators capabilities are available over plural broadband communications networks and accessed through standard mechanisms that promote use by heterogeneous thin or thick client platforms (e.g., mobile phones, smart phones, tablet computers, laptops, PDAs, etc.). The broadband network access includes high speed network access such as 3G and/or 4G wireless and/or wired and broadband and/or ultra-broad band (e.g., WiMAX, etc.) network access.

Resource pooling. Electronic market estimators computing resources are pooled to serve multiple requesters using a multi-tenant model, with different physical and virtual resources dynamically assigned and reassigned according to electronic market estimator calculation demand. There is location independence in that a requester of electronic content has no control and/or knowledge over the exact location of the provided by the electronic market estimator calculation resources but may be able to specify location at a higher level of abstraction (e.g., country, state, or data center). Examples of pooled resources include storage, processing, memory, network bandwidth, virtual server network device and virtual target network devices.

Rapid elasticity. Capabilities can be rapidly and elastically provisioned, in some cases automatically, to quickly scale out and rapidly released to quickly scale for electronic market estimation calculation. To the electronic market estimator calculation services, the electronic market estimator calculation capabilities available for provisioning appear to be unlimited and can be used in any quantity at any time.

Measured Services. Cloud computing systems automatically control and optimize resource use by leveraging a metering capability at some level of abstraction appropriate to the type of electronic market estimators service (e.g., calculating, processing, bandwidth, custom electronic market estimators applications, etc.). Electronic market estimation calculation usage is monitored, controlled, and reported providing transparency for both the electronic market estimator calculations and the electronic market estimation information providers of the utilized electronic market estimators service.

Exemplary cloud computing service models illustrated in FIG. 4 follow. These include:

Cloud Computing Software Applications 62 for an Electronic Market Estimation Calculation Service (CCSA 64). The capability to use the provider's applications running on a cloud infrastructure 66. The cloud computing applications 62, are accessible from the server network device from various client devices through a thin client interface such as a web browser, etc. The user does not manage or control the underlying cloud infrastructure 66 including network, servers, operating systems, storage, or even individual application capabilities, with the possible exception of limited user-specific application configuration settings.

Cloud Computing Infrastructure 66 for the Electronic Market Estimation Calculation Service (CCI 68). The capability provided to the user is to provision processing, storage and retrieval, networks 18, 72, 74, 76, 78 and other fundamental computing resources where the consumer is able to deploy and run arbitrary software, which can include operating systems and applications. The user does not manage or control the underlying cloud infrastructure 66 but has control over operating systems, storage, deployed applications, and possibly limited control of select networking components (e.g., host firewalls, etc.).

Cloud Computing Platform 70 for the Electronic Market Estimation Calculation Service (CCP 71). The capability provided to the user to deploy onto the cloud infrastructure 66 created or acquired applications created using programming languages and tools supported servers, etc. The user not manage or control the underlying cloud infrastructure 66 including network, servers, operating systems, or storage, but has control over the deployed applications and possibly application hosting environment configurations.

Exemplary cloud computing deployment models are provided below. These include:

Private cloud network 72. The cloud network infrastructure is operated solely for electronic market estimation calculations. It may be managed by the electronic content retrieval or a third party and may exist on premise or off premise.

Community cloud network 74. The cloud network infrastructure is shared by several different organizations and supports a specific electronic market estimation content community that has shared concerns (e.g., mission, security requirements, policy, compliance considerations, etc.). It may be managed by the different organizations or a third party and may exist on premise or off premise.

Public cloud network 76. The cloud network infrastructure such as the Internet, PSTN, SATV, CATV, Internet TV, etc. is made available to the general public or a large industry group and is owned by one or more organizations selling cloud services.

Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.).

The foregoing embodiments of the present invention are not limited to these particular characteristics, service models and deployment models, and more, fewer or other characteristics, service models or deployment models can also be used to practice the invention.

Cloud software 64 for electronic market estimation takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application offers cloud services for electronic market estimation calculations. The application offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 62 (SaaS) including a specific cloud software service 62 for electronic market estimation. The IaaS, PaaS and SaaS include one or more of cloud services 62 comprising networking, storage, server network device, virtualization, operating system, middleware, run-time, data and/or application services, or plural combinations thereof, on the cloud communications network 18.

FIG. 5 is a block diagram 80 illustrating an exemplary cloud storage object 82. The cloud storage object 82 preferably includes an envelope portion 84, with a header portion 86, and a body portion 88. The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc. The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. These cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.).

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

The computer systems of the present invention thus include components and operating characteristics that improve the functioning of a computer in an environment of attempting to accurately and expeditiously calculate and disseminate market interest rate estimates in an improved and unexpected manner compared to the prior art. This is much more than simply using a computer to make an existing process run more efficiently.

In one embodiment, as further disclosed in U.S. application Ser. No. 13/570,930, the invention provides an electronic market estimation with market based measures. Plural market estimates are received for a pre-determined set of time periods on an application server network device with one or more processor on a communications network from plural network devices each with one or more processor from plural qualified institutions. The plural qualified institutions have agreed to a pre-determined set of regulations to participate in establishing, conducting business and processing transactions based on calculated market term estimates. The application on the server network device calculates in real-time a market term estimate for each time period in the pre-determined set of time periods to create a calculated set of market term estimates. Next, the application on the server network device securely sends the calculated set of market term estimates to the plural network devices for the plural qualified institutions via the communications network. The qualified institutions are required to conduct business and make transactions based on the calculated set of market term estimates. The calculated set of market term estimates are securely sent from the application on the server network device via the communications network to plural other network devices each with one or more processors to provide one or more electronic markets or trading markets information as an indication of how the qualified institutions are required to conduct business and process transactions based on the calculated set of market term estimates. The application on the server network device provides a secure data feed via the communications network with the calculated set of market term estimates for displaying the calculated market term estimates on other server network devices. This allows the calculated set of market term estimates to be securely sent from the application on the server network device via the communications network to plural target network devices each with one or more processors to provide electronic information as an indication of how the qualified institutions are required to conduct business based and process transactions on the calculated set of market term estimates.

As an example to illustrate the foregoing method, consider Banks A to J that represent participating qualified financial institutions who set (i.e., provide rates and size) an overnight interest rate. Such banks may submit data as an interest rate alone or as an interest rate and size as a market estimate. Table 2 illustrates exemplary market estimates received from the exemplary Banks A to J.

TABLE 2

| S. No | Bank Name | Overnight Rate Submissions | Overnight Night Size ($) |
|---|---|---|---|
| 1 | Bank A | 0.050% | $100,000 |
| 2 | Bank B | 0.067% | $50,000 |
| 3 | Bank C | 0.090% | $150,000 |
| 4 | Bank D | 0.088% | $25,000 |
| 5 | Bank E | 0.068% | $50,000 |
| 6 | Bank F | 0.050% | $250,000 |
| 7 | Bank G | 0.045% | $65,000 |
| 8 | Bank H | 0.072% | $55,000 |
| 9 | Bank I | 0.050% | $75,000 |
| 10 | Bank J | 0.062% | $75,000 |

The application on the server network device calculates in real-time (i.e., in about a few seconds or less, etc.) a market term estimate for each time period in the pre-determined set of time periods to create a calculated set of market term estimates. This includes arranging the plural market estimates for each period are arranged in ascending order. The top 20% of the received entries and bottom 20% of the received market based estimates are eliminated. A term estimate for each period is then calculated as a simple arithmetic average of a remaining entries per period. Table 3 illustrates such an exemplary calculation using the received market term estimates illustrated in Table 2. As shown in Table 3, the received market estimates from Table 2 are arranged in ascending order. The top and bottom 20% are eliminated. The averages of the remaining received market estimates are used to calculate an arithmetic average of the remaining received market estimates.

TABLE 3

| | Bank Name | Overnight Rates (in ascending order) | Overnight Size ($) | Action | |
|---|---|---|---|---|---|
| 7 | Bank G | 0.045% | $65,000 | Eliminated | |
| 1 | Bank A | 0.050% | $100,000 | Eliminated | |
| 6 | Bank F | 0.050% | $250,000 | | Rate Based on Simple Average: 0.0614% Rate based on Volume Weighted Average: 0.0569% |
| 9 | Bank I | 0.050% | $75,000 | | |
| 10 | Bank J | 0.062% | $75,000 | | |
| 2 | Bank B | 0.067% | $50,000 | | |
| 5 | Bank E | 0.068% | $50,000 | | |
| 8 | Bank H | 0.072% | $55,000 | | |
| 4 | Bank D | 0.088% | $25,000 | Eliminated | |
| 3 | Bank C | 0.090% | $150,000 | Eliminated | |

As illustrated in Table 3, an overnight interest rate is calculated using the simple average of overnight rates. The calculated value is 0.0614%.

As an alternate method, a term estimate for each period may be arrived as a volume weighted average of received entries and its accompanying size. However, the present invention is not limited to such calculations and other calculations can be used to practice the invention. The alternative method with volume weighted average using size and rates is 0.0569% for the same entries in Table 3.

In another embodiment, the calculated set of market term estimates includes LIBOR, SIBOR and/or HIBOR estimates. In another embodiment, the created set of market term estimates includes estimates such as interest rates, indices, buy and or sell prices for stocks, bonds, options, commodities, hedge funds and/or any other goods and/or services sold, traded or exchanged via a defined market. The defined market may regulated or unregulated markets. The calculated set of market term estimates can be used on a regulated trading exchange or an unregulated trading exchange. Non-market estimates can also be used to create the set of market term estimates.

The application on the server network device sends the calculated set of market term estimates to the plural network devices for the plural qualified institutions via the communications network. The qualified institutions are required to conduct business and make transactions based on the calculated set of market term estimates.

Once the calculated set of market term estimates has been established, the qualified institutions must make actual transactions using the calculated set of market term estimates. This is illustrated with an exemplary supply-demand curve in Table 4. The example in Table 4 assumes the use of the simple average method discussed previously although it is also operable with the alternate method of a term estimate for each period arrived as a volume weighted average of received entries and its accompanying size.

TABLE 4

| Overnight Rate | Offered Amount ($) | Borrowed Amount ($) |
|---|---|---|
| 0.081% | $250,000 | |
| 0.076% | $200,000 | |
| 0.071% | $150,000 | |
| 0.066% | $100,000 | |
| 0.061% | Equilibrium Overnight Rate | |
| 0.056% | | $100,000 |
| 0.051% | | $150,000 |
| 0.046% | | $200,000 |
| 0.041% | | $250,000 |

As illustrated in Table 4, members of the group of qualified financial institutions (i.e., Banks A through J) must be willing to offer greater and greater amounts of funds above equilibrium rate. Similarly, members of the group of qualified institutions must be willing to borrow greater and greater amounts for successive rates below the equilibrium rates. All qualified institutions members have to be involved in fund transactions (i.e., borrow or lend to other members and others) that satisfy the above supply-demand curve in Table 4. Such transactions are done electronically and are cleared electronically to ensure the qualified institutions comply with the established market term estimates. Once a given level of transactions adds credibility to an established equilibrium rate illustrated in Table 4, it is published widely.

The calculated set of market term estimates are securely sent from the application on the server network device to plural other network devices each with one or more processors to provide one or more electronic markets or trading markets information as an indication of how the qualified institutions are required to conduct business and process transactions based on the calculated set of market term estimates. The application on the server network device thus provides a secure data feed via the communications network with the calculated set of market term estimates for displaying the calculated market term estimates on other server network devices.

The calculated set of market term estimates are securely sent from the application on the server network device to plural target network devices each with one or more processors to provide electronic information as an indication of how the qualified institutions are required to conduct business based on the calculated set of market term estimates. These calculated set of market term estimates are displayed from on a graphical user interface from another application on the plural target network devices to provide information as an indication of how the qualified institutions are required to conduct business and process transactions based on the calculated set of market term estimates.

Figure 6A:
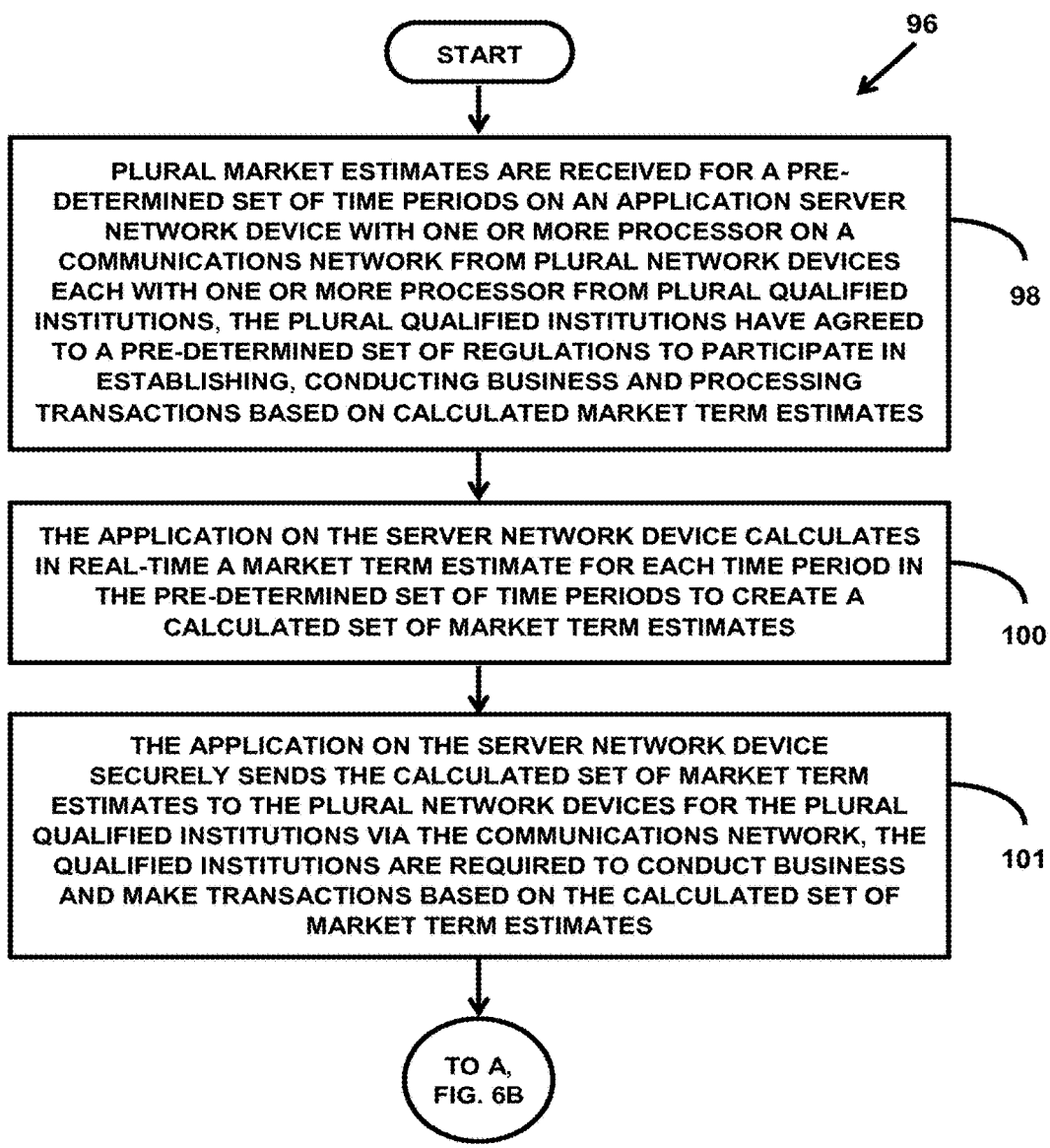
FIGS. 6A, 6B and 6C are flow diagrams illustrating a method for determining market estimates with market based measures.
Figure 6B:
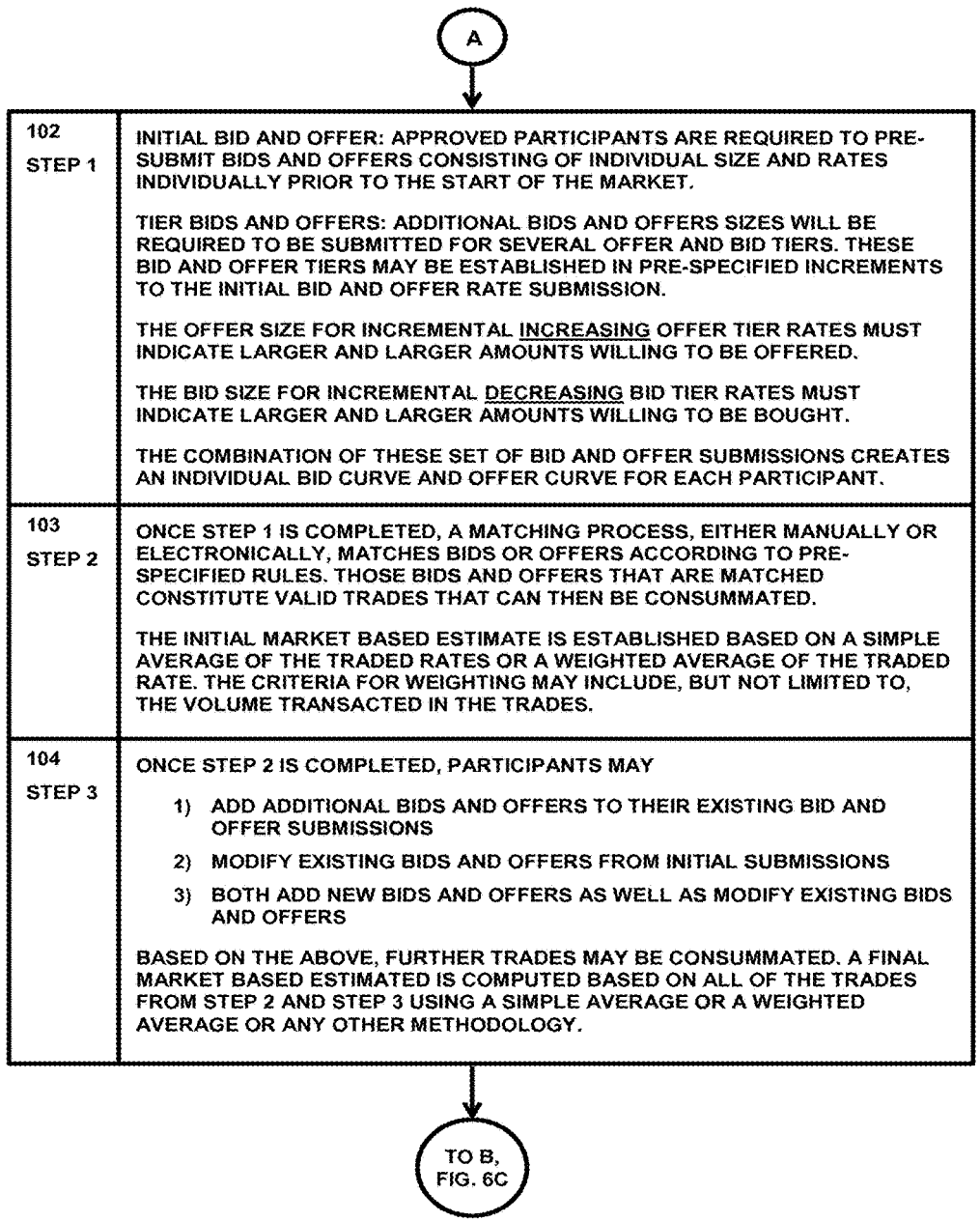
Figure 6C:
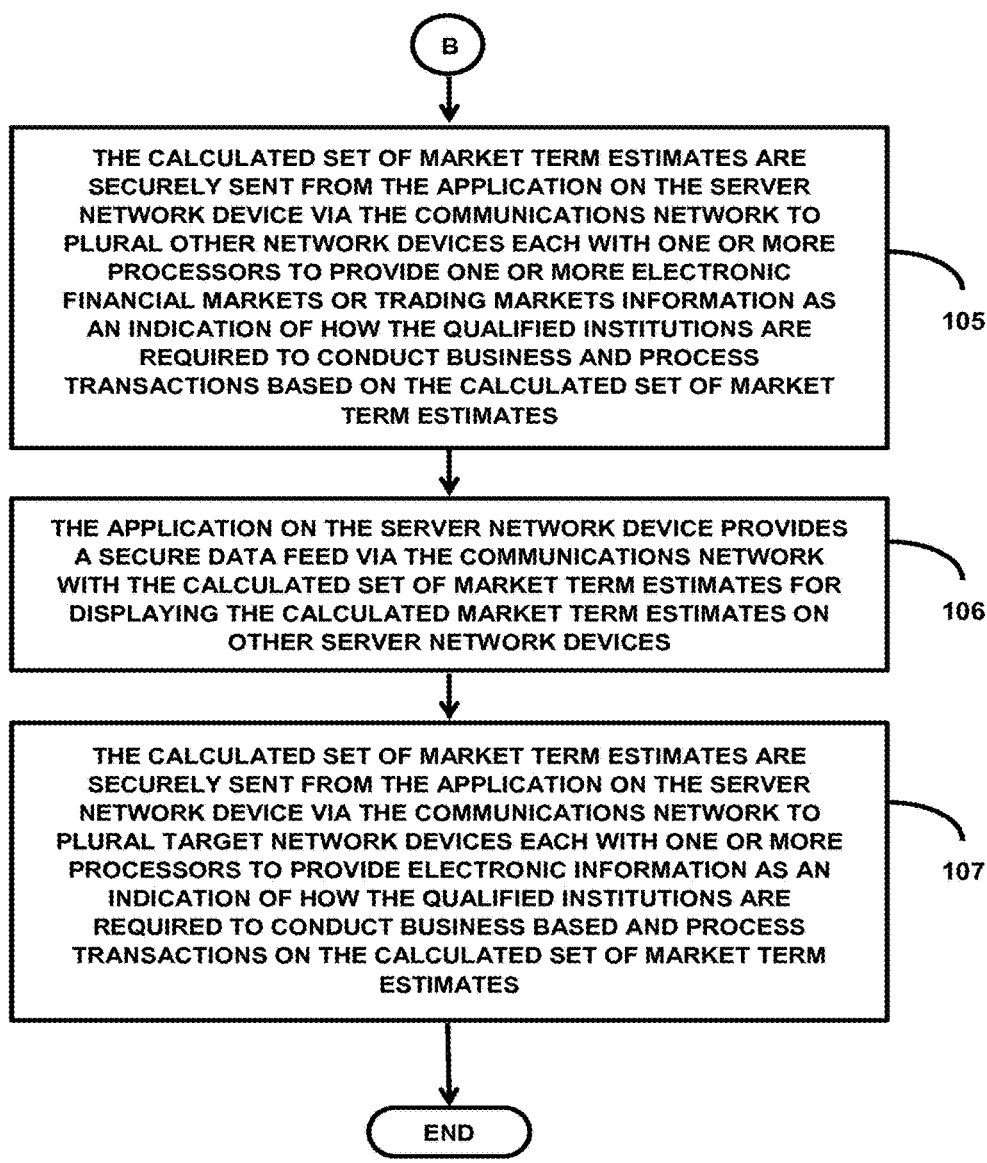

A preferred embodiment is shown in FIGS. 6A, 6B and 6C, wherein the systems and method of the present invention provide further improvements to the way that current market estimates are made using market based measures.

In this embodiment, participants representing qualified financial institutions, including banks, submit a series of offers (rates and size) and bids (rate and size) to build an offer curve and a bid curve according to a set or pre-determined rules. Such predetermined rules may include but not limited to rules around the offer size and bid size, incremental tiers on the offer curve and the bid curve etc. The institutions typically submit market estimates for a set of loans with different maturities.

When the participants have completed building individual offer and bid curves, an electronic matching engine matches bids and offers according to pre-set trading rules, resulting in a series of trades occurring. Each consummated trade provides market based information on the price and quantity that was traded. An initial market based rate is established based on the simple average; volume weighted average or other method and published to the participants.

FIGS. 6A, 6B and 6C combined are a flow diagram illustrating a method 96 for electronic market estimation with market based measures. In FIG. 6A at step 98, plural market estimates are received at a pre-determined time on an application server network device with one or more processor on a communications network from plural network devices each with one or more processor from plural qualified institutions. The plural qualified institutions have agreed to a pre-determined set of regulations to participate in establishing, conducting business and processing transactions based on calculated market term estimates. At Step 100, the application on the server network device calculates in real-time (i.e., within 1 to 2 minutes) an initial market term estimate to create a calculated set of market term estimates. At Step 101, the server network device securely sends the calculated set of market term estimates to the plural network devices for the plural qualified institutions via the communications network.

FIG. 6B illustrates the next three steps. Once the initial market rate has been established, participants will be able to view the initial rate as well as the market offer and bid curves that were submitted by all participants in Step 102. Participants are then allowed to a) add additional bids and offers to the existing submissions or b) modify existing submissions or c) a combination of a) and b) resulting in further trades being consummated. The final market based rate is established based on the simple average or volume weighted average of the trades in Steps 103 and 104.

Examples of such calculations are provided in Tables 5, 6 and 7. To illustrate these Steps of Method 96, consider Banks 1 to 3 that represent participating qualified financial institutions who set (i.e., provide rates and size) an overnight interest rate.

TABLE 5

Member Banks

| | Bank Assets ($) | Minimum Required Bid and Offer Quantities |
|---|---|---|
| Bank 1 | 10 B | $1 Million |
| Bank 2 | 15 B | $2 Million |
| Bank 3 | 25 B | $5 Million |

Such banks may submit data as an interest rate alone or as an interest rate and size as a market estimate.

Table 6 illustrates exemplary market estimates 13 received at Step 98 from the exemplary Banks 1 to 3. Each of the participant Banks separately submit their bid and offer curves as shown in the table, where the Bid and Offer Quantities are in Millions, with Bid and Offer rates in basis points.

TABLE 6

Bid and Offer Quantities

| Bank 1 | Bid Qty (in millions) | Bid Rate (basis points) | Offer Rate (basis points) | Offer Qty (in millions) |
|---|---|---|---|---|
| Ameribor Rate | 1 | 28 | 30 | 1 |
| Tier 1 | 2 | 26 | 32 | 2 |
| Tier 2 | 4 | 24 | 34 | 4 |
| Tier 3 | 8 | 22 | 36 | 8 |
| Bank 2 | Bid Qty | Bid Rate | Offer Rate | Offer Qty |
| Ameribor Rate | 2 | 32 | 33 | 2 |
| Tier 1 | 4 | 30 | 35 | 4 |
| Tier 2 | 8 | 28 | 37 | 8 |
| Tier 3 | 16 | 26 | 39 | 16 |
| Bank 3 | Bid Qty | Bid Rate | Offer Rate | Offer Qty |
| Ameribor Rate | 5 | 29 | 31 | 5 |
| Tier 1 | 10 | 27 | 33 | 10 |
| Tier 2 | 20 | 25 | 35 | 20 |
| Tier 3 | 40 | 23 | 37 | 40 |

The processing steps include the following:
1. Bank 1 initial submissions are presented as shown above.
2. Bank 1 Ameribor bid rate is 28 basis points and bid quantity of $1 million.
3. Bank 1 Ameribor offer rate is 30 basis points and offer quantity is $1 million.
4. Note that Ameribor-Bid and Ameribor-Offer are 2 basis points apart.
5. Based on Ameribor-Bid and Ameribor Offer, a ladder of offers and bids are constructed.
6. Three tiers are constructed that are 2 basis points apart (bid rate decrease by 2 bps and offer rate increase by 2 bps).
7. Across each tier, the offer quantity doubles.

At Step 100 of FIG. 6, the application on the server network device calculates in real-time (i.e., in about a few seconds or less, etc.) a market term estimate for each time period in the predetermined set of time periods to create a calculated set of market term estimates. The results are shown in Table 7.

TABLE 7

Calculated Market Term Estimates
Stage 1: Ameribor Offer and Bid Curve Submission

| Bank   | Bid Qty | Bid rate | Offer rate | Offer Qty | Bank Offer |
|--------|---------|----------|------------|-----------|------------|
|        |         |          | 39         | 16        | Bank 2     |
|        |         |          | 37         | 8         | Bank 2     |
|        |         |          | 37         | 40        | Bank 3     |
|        |         |          | 36         | 8         | Bank 1     |
|        |         |          | 35         | 4         | Bank 2     |
|        |         |          | 35         | 20        | Bank 3     |
|        |         |          | 34         | 4         | Bank 1     |
|        |         |          | 33         | 2         | Bank 2     |
|        |         |          | 33         | 10        | Bank 3     |
| Bank 2 | 2       | 32       | 32         | 2         | Bank 1     |
| Bank 2 | 4       | 30       | 31         | 5         | Bank 3     |
| Bank 3 | 5       | 29       | 30         | 1         | Bank 1     |
| Bank 1 | 1       | 28       |            |           |            |
| Bank 2 | 8       | 28       |            |           |            |
| Bank 3 | 10      | 27       |            |           |            |
| Bank 1 | 2       | 26       |            |           |            |
| Bank 2 | 16      | 26       |            |           |            |
| Bank 3 | 20      | 25       |            |           |            |
| Bank 1 | 4       | 24       |            |           |            |
| Bank 3 | 40      | 23       |            |           |            |
| Bank 1 | 8       | 22       |            |           |            |

Next, trade matching and initial pricing are determined: In Stage 1, Bank 2's two million bid at 32 basis points matches with bank 1 (1 million offer at 30) and bank 3, (5 million offered at 31). This results in the following trades:

Trade 1: 1 million at 30 basis points; Buyer is Bank 2 and seller is Bank 1

Trade 2: 1 million at 31 basis points; buyer is Bank 2 and Seller is Bank 3

The Initial Ameribor Rate is the weighted average of the above trades, or 30.5 bps.

Table 8 shows the remaining bids and offers after the initial matches have occurred at the initially established Ameribor rate of 30.5:

TABLE 8

Remaining Bids and Offers Prior to Auction

| Bank   | Bid Qty | Bid rate | Offer rate | Offer Qty | Bank Offer |
|--------|---------|----------|------------|-----------|------------|
|        |         |          | 39         | 16        | Bank 2     |
|        |         |          | 37         | 8         | Bank 2     |
|        |         |          | 37         | 40        | Bank 3     |
|        |         |          | 36         | 8         | Bank 1     |
|        |         |          | 35         | 4         | Bank 2     |
|        |         |          | 35         | 20        | Bank 3     |
|        |         |          | 34         | 4         | Bank 1     |
|        |         |          | 33         | 2         | Bank 2     |
|        |         |          | 33         | 10        | Bank 3     |
|        |         |          | 32         | 2         | Bank 1     |
|        |         |          | 31         | 4         | Bank 3     |
| Bank 2 | 4       | 30       |            |           |            |
| Bank 3 | 5       | 29       |            |           |            |
| Bank 1 | 1       | 28       |            |           |            |
| Bank 2 | 8       | 28       |            |           |            |
| Bank 3 | 10      | 27       |            |           |            |
| Bank 1 | 2       | 26       |            |           |            |
| Bank 2 | 16      | 26       |            |           |            |
| Bank 3 | 20      | 25       |            |           |            |
| Bank 1 | 4       | 24       |            |           |            |
| Bank 3 | 40      | 23       |            |           |            |
| Bank 1 | 8       | 22       |            |           |            |

At this point, further trading is allowed to occur for a finite time of, e.g., 30 minutes to 2 hours. Bank 2 puts in a new Bid for 4 million at 31 basis points which results in a trade with Bank 3, for 4 million traded at the 31 basis points bid. This in turn results in a final Ameribor rate that is established as weighted average of trades in initial and price confirmation period. These calculations result in a final Ameribor rate of 30.833 basis points.

As an alternate method, a term estimate for each period may be arrived as a volume weighted average of received entries and its accompanying size. The established rate based on one of the above procedures is then available and is provided back to the banks for further trading.

Another embodiment of the above methodology could include the communication of the market based estimate from the above steps to a separate market where the established benchmark estimates could serve as a market information function.

In FIG. 6C at Step 105, the calculated set of market term estimates are securely sent from the application on the server network device via the communications network to plural other network devices each with one or more processors to provide one or more electronic markets or trading markets information as an indication of how the qualified institutions are required to conduct business and process transactions based on the calculated set of market term estimates. At Step 106, the application on the server network device provides a secure data feed via the communications network with the calculated set of market term estimates for displaying the calculated market term estimates on other server network devices. At Step 107, the calculated set of market term estimates are securely sent from the application on the server network device via the communications network to plural target network devices each with one or more processors to provide electronic information as an indication of how the qualified institutions are required to conduct business based and process transactions on the calculated set of market term estimates.

In an exemplary embodiment, in FIG. 6A at Step 98, plural market estimates are received for a pre-determined set of time periods on an application on a server network device with one or more processor on a communications network 18 from plural network devices each with one or more processors for plural qualified institutions. The plural qualified institutions have agreed to a pre-determined set of regulations to participate in establishing and conducting business based on calculated market term estimates.

The qualified institutions include, but are not limited to, financial institutions (e.g., banks, etc.), industrial institutions (e.g., public and private companies in a specific industry (e.g., automobile, housing, manufacturing, food processing, etc.), utility institutions (e.g., electric, natural gas, heating oil, etc.) trading institutions (e.g., stock, bonds, commodities, options, etc.) data providing institutions (e.g., news services Thomson Reuters New Services, Dow Jones News Service, social networking sites, other trading news services, financial news services etc.), environmental institutions and other institutions that provide any type of goods and/or services. The qualified institutions may be public and/or private qualified institutions.

In another embodiment of the invention, the calculated set of market term estimates includes LIBOR, SIBOR and/or HIBOR estimates. In another embodiment, the created set of market term estimates includes estimates such as interest rates, indices, buy and or sell prices for stocks, bonds, options, commodities, hedge funds and/or any other goods and/or services sold, traded or exchanged via a defined market. The defined market may regulated or unregulated markets. The calculated set of market term estimates can be used on a regulated trading exchange or an unregulated trading exchange. Non-market estimates can also be used to create the set of market term estimates.

At Step 105, the application on the server network device sends the calculated set of market term estimates to the plural network devices for the plural qualified institutions via the communications network 18. The qualified institutions are required to conduct business and make transactions based on the calculated set of market term estimates.

Once the calculated set of market term estimates has been established, the qualified institutions must make actual transactions using the calculated set of market term estimates. Once a given level of transactions adds credibility to an established equilibrium rate, it is published widely as is illustrated by Steps 105-107.

In FIG. 6C Step 105, the calculated set of market term estimates are securely sent from the application on the server network device to plural other network devices each with one or more processors to provide one or more electronic markets or trading markets information as an indication of how the qualified institutions are required to conduct business and process transactions based on the calculated set of market term estimates.

At Step 106, the application on the server network device provides a secure data feed via the communications network 18 with the calculated set of market term estimates for displaying the calculated market term estimates on other server network devices.

At Step 107, the calculated set of market term estimates are securely sent from the application on the server network device to plural target network devices each with one or more processors to provide electronic information as an indication of how the qualified institutions are required to conduct business based on the calculated set of market term estimates.

The calculated set of market term estimates are displayed from on a graphical user interface from another application on the plural target network devices to provide information as an indication of how the qualified institutions are required to conduct business and process transactions based on the calculated set of market term estimates.

The transactions at Steps 100, 105 and 107 may be done through an electronic trading platform similar to a commodities exchange (e.g., Chicago Board of Trade (CBOT). Chicago Mercantile Exchange (CME), etc.), stock exchange, an options exchange, a Designated Contract Market (DCM), etc. The transactions may be completed through a regulated (Security and Exchange Commission (SEC), Commodities Futures Trading Commission (CFTC), etc. or non-regulated entity. The same thing applies to equivalent steps of Method 110.

The actual transactions based on these steps can also cleared by a regulated clearing entity similar to a Designated Clearing Organization (DCO) under the CFTC or a non-regulated clearing entity.

In another embodiment, the steps of Method 96 can be practiced manually. In such an embodiment, qualified institutions can be polled manually (e.g., via telephone calls, facsimile, etc.), and transactions be conducted over-the counter. Based on these transactions the calculated set of market term estimates completed with a calculator, in a spreadsheet, etc. and the results published in a non-electronic format (e.g., published in newspaper, returned by facsimile, etc.). Therefore, the present invention can be practiced directly as a new business method as well.

Electronic Market Estimation with Market Based Measures with Cloud Computing

Figure 7B:
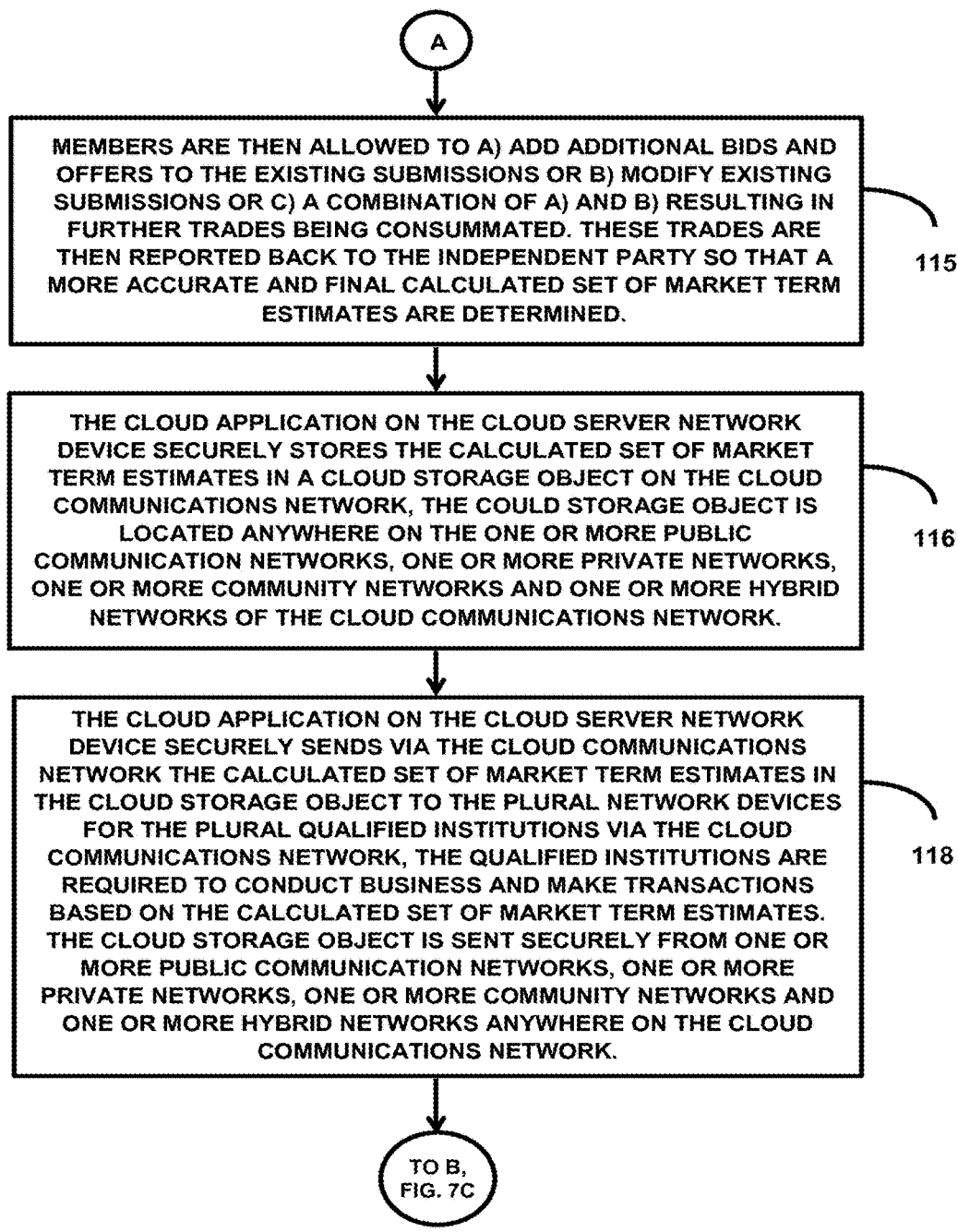
Figure 7C:
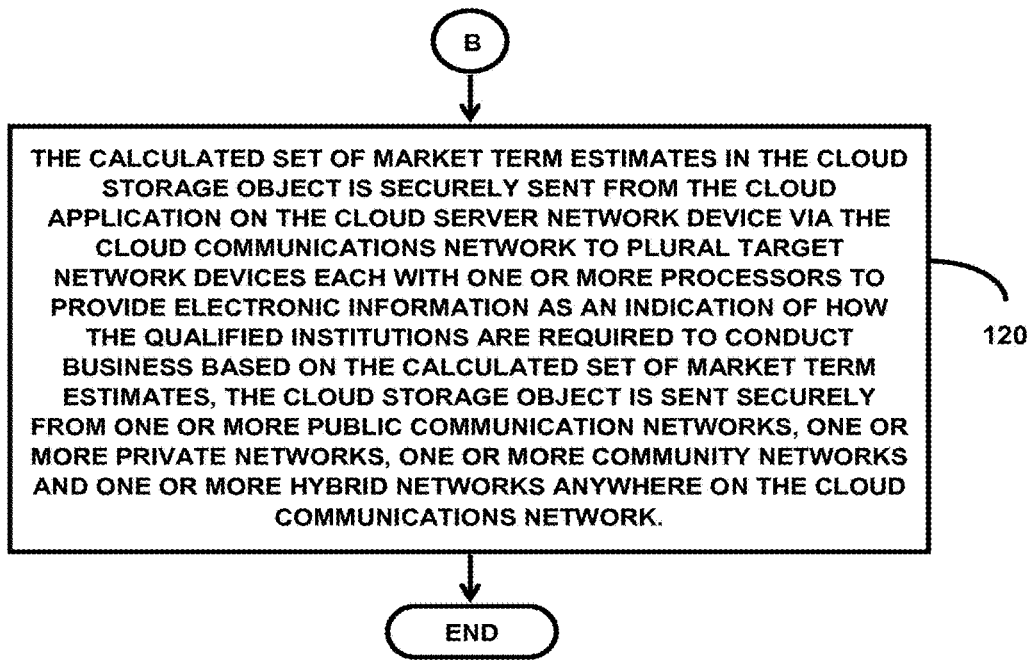

FIGS. 7A, 7B and 7C are flow diagrams illustrating a Method 110 for electronic market estimation with market based measures on a cloud communications network. In FIG. 7A at Step 112, plural market estimates are received for a pre-determined set of time periods on a cloud application on a cloud server network device with one or more processor on a cloud communications network from plural network devices each with one or more processors for a plural qualified institutions. The plural qualified institutions have agreed to a pre-determined set of regulations to participate in establishing, conducting business and processing transactions based on calculated market term estimates, the cloud communications network comprising: one or more public communication networks, one or more private networks, one or more community networks and one or more hybrid networks. At Step 114, the cloud application on the cloud server network device calculates in real-time a market term estimate for each time period in the pre-determined set of time periods to create a calculated set of market term estimates using less bandwidth and less processing cycles on the cloud communications network than on a non-cloud communications network.

In FIG. 7B at Step 115, members are then allowed to a) add additional bids and offers to the existing submissions or b) modify existing submissions or c) a combination of a) and b) resulting in further trades being consummated. These trades are then reported back to the independent party or agency so that a more accurate and final calculated set of market term estimates are determined. These estimates are securely stored in the cloud and are communicated back to the member institutions in Steps 116 and 118. At Step 116, the cloud application on the cloud server network device securely stores the calculated set of initial market term estimates in a cloud storage object on the cloud communications network. The cloud storage object is located anywhere on the one or more public communication networks, one or more private networks, one or more community networks and one or more hybrid networks of the cloud communications network. At Step 118, the cloud application on the cloud server network device securely sends via the cloud communications network the calculated set of market term estimates in the cloud storage object to the plural network devices for the plural qualified institutions via the cloud communications network.

The qualified institutions are required to conduct business and make transactions based on the calculated set of market term estimates. The cloud storage object is sent securely from one or more public communication networks, one or more private networks, one or more community networks and one or more hybrid networks anywhere on the cloud communications network.

In FIG. 7C at Step 120, the calculated set of market term estimates in the cloud storage object is securely sent from the cloud application on the cloud server network device via the cloud communications network to plural target network devices each with one or more processors to provide electronic information as an indication of how the qualified institutions are required to conduct business based on the calculated set of market term estimates. The cloud storage object is sent securely from one or more public communication networks, one or more private networks, one or more community networks and one or more hybrid networks anywhere on the cloud communications network.

In an exemplary embodiment, in FIG. 7A at Step 112, plural market estimates are received for a pre-determined set of time periods on a cloud application on a cloud server network device with one or more processors on a cloud communications network 18 from plural network devices each with one or more processors for a plural qualified institutions. The plural qualified institutions have agreed to a pre-determined set of regulations to participate in establishing, conducting business and processing transactions based on calculated market term estimates, the cloud communications network 18 comprising: one or more public communication networks 76, one or more private networks 72, one or more community networks 74 and one or more hybrid networks 78.

At Step 114, the cloud application on the cloud server network device calculates in real-time a market term estimate for each time period in the pre-determined set of time periods to create a calculated set of market term estimates using less bandwidth and less processing cycles on the cloud communications network 18 than on a non-cloud communications network.

In FIG. 7B at Step 115, members are then allowed to a) add additional bids and offers to the existing submissions or b) modify existing submissions or c) a combination of a) and b) resulting in further trades being consummated. These trades are then reported back to the independent party so that a more accurate and final calculated set of market term estimates are determined. These estimates are securely stored in the cloud and are communicated back to the member institutions in Steps 116 and 118. The qualified institutions are required to conduct business and make transactions based on the final calculated set of market term estimates. The cloud storage object is sent securely from one or more public communication networks 76, one or more private networks 72, one or more community networks 74 and one or more hybrid networks 78 anywhere on the cloud communications network 18.

At Step 116, the cloud application on the cloud server network device securely stores the calculated set of market term estimates in a cloud storage object 82 on the cloud communications network 18. The cloud storage object 82, and/or portions thereof is located anywhere on the one or more public communication networks 76, one or more private networks 72, one or more community networks 74 and one or more hybrid networks 78 of the cloud communications network 18.

At Step 118, the cloud application 30' on the cloud server network device 20 securely sends via the cloud communications network 18 the calculated set of market term estimates 15 in the cloud storage object 82 to the plural network devices 22, 24, 26 for the plural qualified institutions via the cloud communications network. In FIG. 7C at Step 120, the calculated set of market term estimates 15 in the cloud storage object 82 are securely sent from the cloud application 30' on the cloud server network device 20 via the cloud communications network 18 to plural target network devices 12, 14, 16 each with one or more processors to provide electronic information as an indication of how the qualified institutions are required to conduct business based on the calculated set of market term estimates 15. The cloud storage object 82 is sent securely from one or more public communication networks 76, one or more private networks 72, one or more community networks 74 and one or more hybrid networks 78 anywhere on the cloud communications network 18.

The calculated set of market term estimates are displayed from on a graphical user interface from another cloud application on the plural target network devices to provide information as an indication of how the qualified institutions are required to conduct business and process transactions based on the calculated set of market term estimates.

Accordingly, the present invention provides advanced, financially guaranteed products in an organized and regulated inter-bank funds electronic market preferably for mid-sized banks. The process provides the following advantages:

A standardized spot and futures contracts for inter-bank funds
A secure electronic marketplace
Low transaction costs
Transparent prices
Quickly cleared transactions
Overall regulation by an independent third party and compliance providers.

The method and system describe herein provide market estimates for a set of time periods are received from plural qualified institutions that have agreed to a pre-determined set of regulations to participate in establishing, conducting business and processing transactions based on calculated market term estimates. A set of market term estimates (e.g., LIBOR, interest rates, stocks, bonds, options, other goods and services, etc.) and non-market term estimates are calculated in real-time for each time period in the set of time periods. The calculated set of market term estimates is sent to qualified institutions. The qualified institutions are required to conduct business and make transactions based on the calculated set of market term estimates. The calculated set of market term estimates is created and used on both cloud communication networks and non-cloud communications networks.

The market term estimates can be derived from different sources, including interest rates, hedge fund indices that provide performance benchmarks based on representative samples from different hedge funds, commodity rates (e.g., gold, silver or other commonly traded commodities), foreign exchange rates and any other market indexes or market based rates that are based on estimates.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein. As noted herein, the components of the system improve the functioning of the computers in an environment of attempting to accurately and expeditiously calculate and disseminate market interest rate estimates in an improved and unexpected manner compared to the prior art.

In view of the wide variety of embodiments to which the principles of the present invention can be applied, it should be understood that the illustrated embodiments are exemplary only, and should not be taken as limiting the scope of the present invention. Also, while various elements of the preferred embodiments have been described as being implemented in software, in other embodiments hardware or firmware implementations may alternatively be used, and vice-versa. Thus, the claims should be read to cover all embodiments that come within the scope and spirit of the invention including equivalents thereto.

What is claimed is:

1. A computerized, multi-step electronic loan transaction trading system that is coupled with a plurality of qualified institutions including trading party computerized systems, said system including:
   an application server, wherein during a first electronic trading step, said application server receives first trading party data from a first trading party computerized system, said first trading party data including:
   first trading party identity data; and first trading party interest rate data for an electronic loan transaction, wherein said application server receives second trading party data from a second trading party computerized system, said second trading party data including:
second trading party identity data; and
second trading party interest rate data for said electronic loan transaction, wherein said application server includes or is coupled to a structured database that includes a predetermined, stored computerized listing of a plurality of trading party identity data in addition to said first trading party identity data and said second trading party identity data, wherein said computerized listing represents the only trading party computerized systems from which trading party data will be accepted during said first electronic trading step and from which trading party data is required to be received during said first electronic trading step, wherein the application server includes a plurality of parallel communication channels for communications of transaction and account data with the trading party computerized systems of the qualified institutions at the same time, wherein, when said application server automatically electronically determines that:
a) said first trading party identity data matches a trading party identity data included in said predetermined, stored computerized listing,
b) said second trading party identity data matches a trading party identity data included in said predetermined, stored computerized listing, and
c) interest rate data for said electronic loan transaction has been received from all trading party computerized systems representing a trading party identity data included in said predetermined, stored computerized listing, said application server determines an average market rate data for said electronic loan transaction representing an average market rate determined by averaging said interest rate data received from all trading party computerized systems having a trading party identity data included in said predetermined, stored computerized listing, wherein submission of said first trading party data by said first trading party computerized system represents an irrevocable command to execute a trade in said electronic loan transaction at said average market rate once it is determined, even when said average market rate differs from said first trading party interest rate data for said electronic loan transaction;

wherein submission of said second trading party data by said second trading party computerized system represents an irrevocable command to execute a trade in said electronic loan transaction at said average market rate once it is determined, even when said average market rate differs from said second trading party interest rate data for said electronic loan transaction; and an electronic trading platform, wherein said electronic trading platform receives from said application server:
said first trading party identity data;
said second trading party identity data; and
said average market rate data for said electronic loan transaction, wherein said electronic trading platform automatically executes an electronic trade in said electronic loan transaction at said average market rate between said first trading party computerized system and said second trading party computerized system, wherein, during a second electronic trading step,
said electronic trading platform transmits data representing said electronic trade and said average market rate data to a plurality of wider market computerized systems at the same time, wherein said wider market computerized systems include computerized systems in addition to said trading party computerized systems representing a trading party identity data included in said predetermined, stored computerized listing, wherein said electronic trading platform accepts from said wider market computerized systems trade data representing revocable trading commands to execute trades in said electronic loan transaction.

2. The system of claim 1, wherein said application server includes a predetermined, stored computerized listing of a set of electronic loan transactions representing a plurality of maturities.

3. The system of claim 2, wherein said first trading party data includes first trading party interest rate data for a plurality of electronic loan transactions and said second trading party data includes second trading party interest rate data for said plurality of electronic loan transactions.

4. The system of claim 3, wherein said application server automatically electronically determines that interest rate data for said plurality of electronic loan transactions has been received from all trading party computerized systems representing a trading party identity data included in said predetermined, stored computerized listing.

5. The system of claim 4, wherein said application server determines an average market rate data for each of said plurality of electronic loan transactions representing an average market rate for each of said plurality of electronic loan transactions determined by averaging said interest rate data for each of said plurality of electronic loan transactions received from all trading party computerized systems having a trading party identity data included in said predetermined, stored computerized listing.

6. The system of claim 5, wherein submission of said first trading party data by said first trading party computerized system represents an irrevocable command to execute a trade in at least one of said plurality of said electronic loan transactions at said average market rate once it is determined, even when said average market rate differs from said first trading party interest rate data for said electronic loan transaction.

7. A computerized, multi-step electronic loan transaction trading system that is coupled with a plurality of qualified institutions including trading party computerized systems, said system including:
an application server, wherein during a first electronic trading step, said application server receives first trading party data from a first trading party computerized system, said first trading party data including:
first trading party identity data;
first trading party electronic loan transaction trade amount data; and
first trading party interest rate data for an electronic loan transaction, wherein said application server receives second trading party data from a second trading party computerized system, said second trading party data including:
second trading party identity data;
second trading party electronic loan transaction trade amount data; and second trading party interest rate data for said electronic loan transaction, wherein said application server includes or is coupled to a structured database that includes a predetermined, stored computerized listing of a plurality of trading party identity data in addition to said first trading party identity data and said second trading party identity data, wherein said computerized listing represents the only trading party computerized systems from which trading party data will be accepted during said first electronic trading step and from which trading party data is required to be received during said first electronic trading step, wherein the application server includes a plurality of parallel communication channels for communications of transaction and account data with the trading party computerized systems of the qualified institutions at the same time, wherein, when said application server automatically electronically determines that:
  a) said first trading party identity data matches a trading party identity data included in said predetermined, stored computerized listing,
  b) said second trading party identity data matches a trading party identity data included in said predetermined, stored computerized listing,
  c) interest rate data for said electronic loan transaction has been received from all trading party computerized systems representing a trading party identity data included in said predetermined, stored computerized listing,
  d) electronic loan transaction trade amount data has been received from all trading party computerized systems representing a trading party identity data included in said predetermined, stored computerized listing, said application server determines an average market rate data for said electronic loan transaction representing an average market rate determined by calculating a weighted average based on said electronic loan transaction trade amount data and said interest rate data received from all trading party computerized systems having a trading party identity data included in said predetermined, stored computerized listing, wherein submission of said first trading party data by said first trading party computerized system represents an irrevocable command to execute a trade in said electronic loan transaction at said average market rate once it is determined, even when said average market rate differs from said first trading party interest rate data for said electronic loan transaction;

wherein submission of said second trading party data by said second trading party computerized system represents an irrevocable command to execute a trade in said electronic loan transaction at said average market rate once it is determined, even when said average market rate differs from said second trading party interest rate data for said electronic loan transaction; and an electronic trading platform, wherein said electronic trading platform receives from said application server:
  said first trading party identity data;
  said second trading party identity data; and
  said average market rate data for said electronic loan transaction, wherein said electronic trading platform automatically executes an electronic trade in said electronic loan transaction at said average market rate between said first trading party computerized system and said second trading party computerized system, wherein, during a second electronic trading step,
said electronic trading platform transmits data representing said electronic trade and said average market rate data to a plurality of wider market computerized systems at the same time, wherein said wider market computerized systems include computerized systems in addition to said trading party computerized systems representing a trading party identity data included in said predetermined, stored computerized listing, wherein said electronic trading platform accepts from said wider market computerized systems trade data representing revocable trading commands to execute trades in said electronic loan transaction.

8. The system of claim 7, wherein said application server includes a predetermined, stored computerized listing of a set of electronic loan transactions representing a plurality of maturities.

9. The system of claim 8, wherein said first trading party data includes first trading party interest rate data for a plurality of electronic loan transactions and said second trading party data includes second trading party interest rate data for said plurality of electronic loan transactions.

10. The system of claim 9, wherein said application server automatically electronically determines that interest rate data for said plurality of electronic loan transactions has been received from all trading party computerized systems representing a trading party identity data included in said predetermined, stored computerized listing.

11. The system of claim 10, wherein said application server determines an average market rate data for each of said plurality of electronic loan transactions representing an average market rate for each of said plurality of electronic loan transactions determined calculating a weighted average based on said electronic loan transaction trade amount data and said interest rate data for each of said plurality of electronic loan transactions received from all trading party computerized systems having a trading party identity data included in said predetermined, stored computerized listing.

12. The system of claim 11, wherein submission of said first trading party data by said first trading party computerized system represents an irrevocable command to execute a trade in at least one of said plurality of said electronic loan transactions at said average market rate once it is determined, even when said average market rate differs from said first trading party interest rate data for said electronic loan transaction.

13. A method for electronic market estimation with market based measures on a cloud communications network wherein one or more computer processors on the cloud communications network perform operations which comprises:

receiving a plurality of electronic agreements from a plurality of network devices each with one or more processors for a plurality of qualified institutions on a cloud application on a cloud server network device with one or more processors on a cloud communications network, the plurality of electronic agreements including a pre-determined set of regulations for the plurality of qualified institutions to participate in establishing, conducting business and processing transactions based on market term estimates calculated on the application on the server network device the cloud communications network comprising: one or more public communication networks, one or more private networks, one or more community networks and one or more hybrid networks:

receiving a plurality of market estimates for a pre-determined set of time periods on the cloud application on the cloud server network device with one or more processors on the cloud communications network from the plurality of network devices each with one or more processors for a plurality of qualified institutions, wherein the cloud server network device includes a plurality of parallel communication channels for communications of transaction and account data with the network devices for the qualified institutions at the same time;

calculating in real-time on the cloud application on the cloud server network device a market term estimate for each time period in the pre-determined set of time periods to create a calculated set of market term estimates, wherein the calculated set of market term estimates are compiled and made available in real-time at a time-1 only to the plurality of qualified institutions until one or more actual transactions have been completed between the one or more qualified institutions using one or more market term estimates from the calculated set of market term estimates;

storing securely with the cloud application on the cloud server network device the calculated set of market term estimates in a cloud storage object on the cloud communications network, wherein the cloud storage object is located anywhere on the one or more public communication networks, one or more private networks, one or more community networks and one or more hybrid networks of the cloud communications network;

sending securely in real-time at time-1 from the cloud application on the cloud server network device via the cloud communications network the calculated set of market term estimates in the cloud storage object to the plurality of network devices for the plurality of qualified institutions via the cloud communications network, wherein the cloud storage object is sent securely from one or more public communication networks, one or more private networks, one or more community networks and one or more hybrid networks anywhere on the cloud communications network;

presenting and displaying the securely sent set of compiled calculated market term estimates on computer displays of the qualified institutions for viewing and determining how to conduct business or transactions, wherein the plurality of qualified institutions have agreed to be obligated to conduct all business and make all transactions based on the calculated set of market term estimates calculated on, sent from the application on the server network device, and viewed on the computer displays, wherein the qualified institutions conduct business by requiring some institutions to offer amounts of funds at higher rates above the market term estimates, requiring other institutions to borrow amounts of funds at lower rates below the market term estimates, and requiring all institutions to transact a certain amount of funds with other institutions, with all transactions conducted and cleared electronically;

receiving one or more messages on the cloud application on the cloud server network device via the cloud communications network from two or more of the network devices for two or more selected ones of qualified institutions from the plurality of qualified institutions;

receiving confirmations of one or more actual transactions that have been completed between the two or more selected ones qualified institutions using one or more market term estimates from the calculated set of market term estimates to ensure that the institutions are complying with the established market term estimates;

sending securely in real-time at a later time-2 the calculated set of market term estimates in the cloud storage object from the cloud application on the cloud server network device via the cloud communications network to a plurality of other server network devices and to a plurality of other target network devices each with one or more processors to provide electronic information as an indication of how the qualified institutions are required to further conduct business based on the calculated set of market term estimates, wherein the cloud storage object is sent securely from one or more public communication networks, one or more private networks, one or more community networks and one or more hybrid networks anywhere on the cloud communications network: and displaying in real-time at a later time-3 from the cloud application on the cloud server network device via the cloud communications network on a plurality of graphical user interfaces on the plurality of other server network devices and the plurality of target network devices, the calculated set of market term estimates in the cloud storage object to provide further requirements of how the qualified institutions are required to conduct business and process transactions based on the calculated set of market term estimates for each time period in the pre-determined set of time periods.

14. The method of claim 13, further comprising:

calculating a set of non-market term estimates for each time period in another pre-determined set of time periods to create a calculated set of non-market term estimates, wherein the non-market estimates include estimate values of goods and services that are not bought and sold or traded in defined financial or trading markets; and requiring the plurality of qualified institutions to conduct all business and make all transactions based on the calculated set of non-market term estimates calculated on the application on the server network device.

15. The method of claim 13, wherein the qualified institution includes financial institutions, industrial institutions, utility institutions, trading institutions, data providing institutions, environmental institutions and other institutions that provide goods or services, and wherein the calculated set of market terms includes market terms and indexes for stocks, bonds, commodities, hedge funds, goods or services sold, traded or exchanged via a defined market.

16. The method of claim 13, wherein the calculating step includes:

arranging the plurality of received market estimates in ascending order; eliminating a top 20% and a bottom 20% of the plurality of received market estimates; and calculating a term estimate for each time period in the pre-determined set of time periods as a simple arithmetic average of remaining entries per time period or by a volume weighted average of the plurality of received market estimates and an accompanying size of the of the plurality of received market estimates.

17. The method of claim 13, wherein the calculating step includes:

receiving from participating qualified financial institutions bids and offers based on an overnight interest rate;

conducting trades between participants based on matching bids and offers that are received in order to calculate an initial a market term estimate;

allowing further trading to occur based on the initial market term estimate; and establishing a final market term estimate as weighted average of all trades.

18. The method of claim 13, wherein the cloud storage object includes one or more of a REpresentational State Transfer (REST) or Simple Object Access Protocol (SOAP), Lightweight Directory Access Protocol (LDAP) cloud storage objects, portions thereof, or combinations thereof and the sending securely steps include securely sending using a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), Transport Layer Security (TLS) security method.

19. The method of claim 13, wherein the cloud server network device and the target network device include a wireless networking interface comprising a Worldwide Interoperability for Microwave Access (WiMax) wireless networking interface with 4th generation (4G) wireless speeds for communicating with the cloud communications network, wherein the cloud communications network includes an electronic market term estimate calculation service, a cloud computing platform for the electronic market term estimate calculation service and a cloud computing infrastructure for the market term estimate calculation service and wherein the cloud application offers a cloud computing Infrastructure as a Service (IaaS), a cloud Platform as a Service (PaaS) and offers a Specific cloud software service as a Service (SaaS) including a specific cloud software service for electronic market term estimate calculations.

20. The method of claim 13, wherein calculated set of market terms includes a London Interbank Offered Rate (LIBOR) interest rate, a Singapore Interbank Offered Rate (SIBOR) interest rate or a Hong Kong Interbank Offered Rate (HIBOR) interest rate and other equivalents, market terms and indexes for stocks, bonds, commodities, hedge funds, goods or services sold, traded or exchanged via a defined market, and the method further comprises displaying from on a graphical user interface from another cloud application on the plurality of target network devices the calculated set of market term estimates to provide information as an indication of how the qualified institutions are required to conduct business and process transactions based on the calculated set of market term estimates.

* * * * *